US012656623B2

(12) United States Patent
Wu et al.

(10) Patent No.: US 12,656,623 B2
(45) Date of Patent: Jun. 16, 2026

(54) CAMERA MODULE, CAMERA LENS WITH MARK AND MANUFACTURING METHOD THEREOF, AND ASSEMBLY METHOD OF EXTRA-WIDE-ANGLE CAMERA MODULE

(71) Applicant: NINGBO SUNNY OPOTECH CO., LTD, Zhejiang (CN)

(72) Inventors: Bing Wu, Zhejiang (CN); Kailun Zhou, Zhejiang (CN); Wei Li, Zhejiang (CN); Yu Huang, Zhejiang (CN); Yan Jin, Zhejiang (CN)

(73) Assignee: NINGBO SUNNY OPOTECH CO., LTD, Zhejiang (CN)

( * ) Notice: Subject to any disclaimer, the term of this patent is extended or adjusted under 35 U.S.C. 154(b) by 854 days.

(21) Appl. No.: 17/773,219

(22) PCT Filed: Aug. 31, 2020

(86) PCT No.: PCT/CN2020/112491
§ 371 (c)(1),
(2) Date: Apr. 29, 2022

(87) PCT Pub. No.: WO2021/082708
PCT Pub. Date: May 6, 2021

(65) Prior Publication Data
US 2022/0382070 A1 Dec. 1, 2022

(30) Foreign Application Priority Data

Oct. 29, 2019 (CN) .......................... 201911037398.5
Oct. 29, 2019 (CN) .......................... 201911037405.1

(51) Int. Cl.
*G02B 27/62* (2006.01)
*H04N 5/225* (2006.01)
*H04N 23/55* (2023.01)

(52) U.S. Cl.
CPC ............. *G02B 27/62* (2013.01); *H04N 23/55* (2023.01)

(58) Field of Classification Search
CPC ........... G02B 27/62; G02B 7/09; H04N 23/55
(Continued)

(56) References Cited

U.S. PATENT DOCUMENTS 5,249,082 A * 9/1993 Newman ................ G02B 7/028
359/813
6,390,693 B1 5/2002 Miyamoto et al.
(Continued)

FOREIGN PATENT DOCUMENTS

CN 101174013 5/2008
CN 208384208 1/2019
(Continued)

OTHER PUBLICATIONS

International Search Report issued Nov. 27, 2020, in International (PCT) Application No. PCT/CN2020/112491, with English translation.
(Continued)

*Primary Examiner* — Stephone B Allen
*Assistant Examiner* — Boutsikaris Leonidas
(74) *Attorney, Agent, or Firm* — Wenderoth, Lind & Ponack, L.L.P.

(57) ABSTRACT

Provided are a camera module, a camera lens with a mark and a manufacturing method thereof, and an assembly method of an extra-wide-angle camera module. The camera module includes a camera lens and a photosensitive assembly. The camera lens includes a lens tube, at least one first lens unit, at least one second lens unit and at least one mark element. The first lens unit and the second lens unit are provided in the lens tube. The first lens unit is a non-
(Continued)

rotational member. The mark element is provided at the lens tube, and is used to position the first lens unit.

18 Claims, 19 Drawing Sheets

(58) Field of Classification Search
USPC ......................................................... 359/822
See application file for complete search history.

(56) References Cited

U.S. PATENT DOCUMENTS

| | | | | |
|---|---|---|---|---|
| 2007/0047110 A1* | 3/2007 | Matsushima | .......... | G02B 7/023 |
| | | | | 359/819 |
| 2009/0316278 A1* | 12/2009 | Yen | ........................ | G02B 7/021 |
| | | | | 359/716 |
| 2015/0089789 A1* | 4/2015 | Nagayama | ......... | G01M 11/0221 |
| | | | | 29/525.01 |
| 2017/0176705 A1* | 6/2017 | Wang | ..................... | G02B 7/025 |
| 2019/0373147 A1* | 12/2019 | Yamamoto | ............. | H04N 23/55 |

FOREIGN PATENT DOCUMENTS

| | | |
|---|---|---|
| CN | 208506341 | 2/2019 |
| CN | 208572216 | 3/2019 |
| CN | 109683273 | 4/2019 |
| CN | 110320625 | 10/2019 |
| CN | 110557523 | 12/2019 |
| CN | 111090159 | 5/2020 |
| EP | 3 761 098 | 1/2021 |
| EP | 3 787 274 | 3/2021 |
| EP | 3 851 882 | 7/2021 |
| JP | 2008-033065 | 2/2008 |
| JP | 2010-191345 | 9/2010 |

OTHER PUBLICATIONS

Office Action issued Mar. 28, 2025 in U.S. Appl. No. 17/772,636.

* cited by examiner

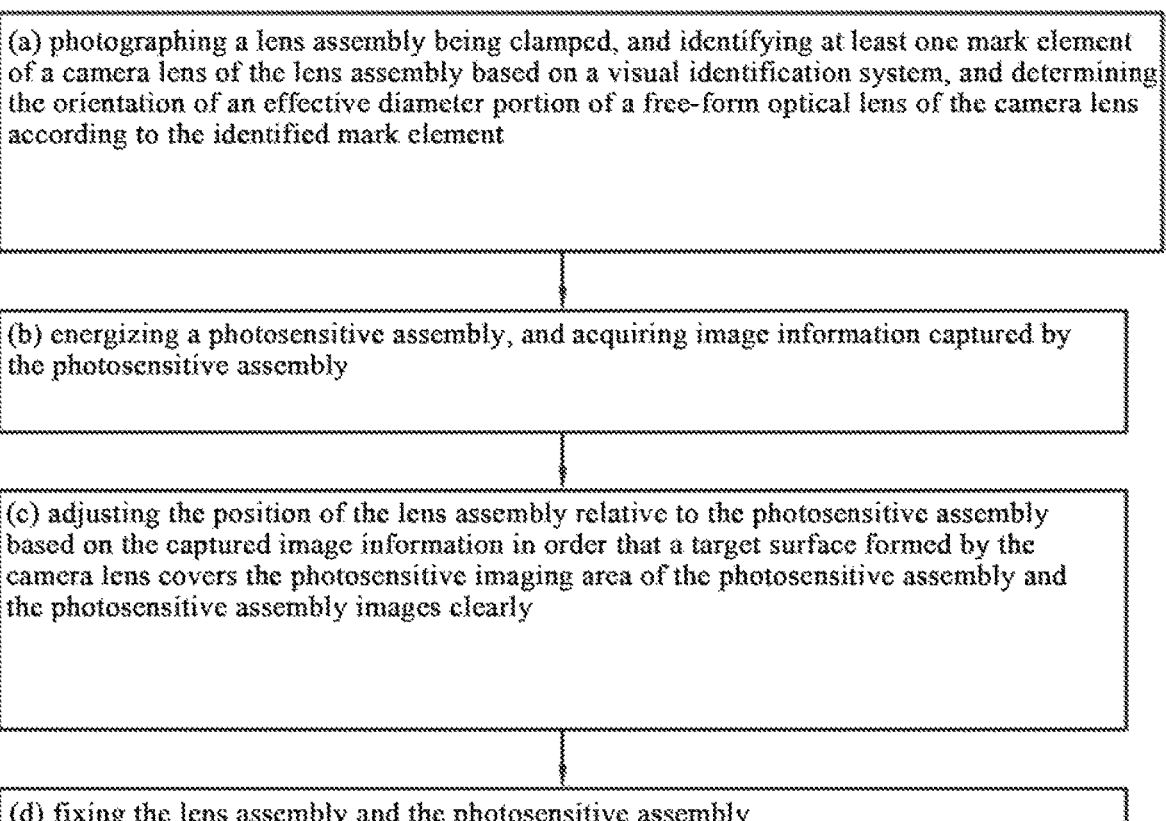

(a) photographing a lens assembly being clamped, and identifying at least one mark element of a camera lens of the lens assembly based on a visual identification system, and determining the orientation of an effective diameter portion of a free-form optical lens of the camera lens according to the identified mark element (b) energizing a photosensitive assembly, and acquiring image information captured by the photosensitive assembly (c) adjusting the position of the lens assembly relative to the photosensitive assembly based on the captured image information in order that a target surface formed by the camera lens covers the photosensitive imaging area of the photosensitive assembly and the photosensitive assembly images clearly (d) fixing the lens assembly and the photosensitive assembly

Figure 15

CAMERA MODULE, CAMERA LENS WITH MARK AND MANUFACTURING METHOD THEREOF, AND ASSEMBLY METHOD OF EXTRA-WIDE-ANGLE CAMERA MODULE

FIELD OF THE INVENTION

The present invention relates to a camera module, in particular to a camera module, a camera lens with mark and a manufacturing method thereof, and an assembly method of an extra-wide-angle camera module.

BACKGROUND OF THE INVENTION

With the popularity of mobile electronic devices, camera devices have become an essential part of the electronic terminal equipment, and are used to meet the needs of users to capture images. Array camera modules usually contain at least two camera modules, according to different photo requirements, camera modules with different functions are combined to achieve better performance than single lens camera in zoom shooting, wide field shooting, etc., and it becomes a popular application today and in the future.

At present, array camera modules usually contain telephoto camera modules, wide-angle camera modules, common modules, for example common dual camera modules adopts telephoto modules and wide-angle module composition. For a single electronic terminal equipped with an array of camera modules, the increase in the number of camera modules and the addition of new functional camera modules put forward higher requirements of production process, production efficiency and assembly of camera modules.

Due to the large field angle of the extra-wide-angle camera module, the field curve distortion caused by the large tilt of the light is larger, for example the camera lens with 130° field angle of view, the distortion is greater than 10%. In the use of the existing checkerboard type calibration board for photo test, large distortion during the test of the resolution of wide angle camera module makes it difficult to test the four corner resolution with a conventional CTF calibration board, that is, the image captured by the wide angle camera module is influenced by distortion and in the peripheral test, straight lines bend seriously. In the use of existing edge processing algorithms for calculation, the error is large, the overall resolution of the wide-angle camera module is poor, software for distortion correction is commonly used. On one hand, as the field angle of the wide-angle camera module is getting larger and larger, and the distortion range that the software can adjust is limited, it is difficult to meet the correction required by the distortion generated by the field angle of more than 110°. On the other hand, distortion correction with software will have the problem of pixel loss in the adjustment area, and the amount of image data that needs to be processed using software correction is very large and the hardware requirements are very high.

In order to solve the distortion problem of wide-angle camera module, it starts from the improvement of the optical system itself, free-form optic lens are used to replace at least one of the common optic lens in the pair of lenses, and the optical path design of the optical system is carried out by using the design freedom of free-form surface to reduce the distortion effect results from extra-wide-angle, in order to improve the technical parameters of the optical system. Since the free-form optics are non-rotationally symmetric, there is a large uncertainty when the free-form optics are mounted, especially during the assembly of the camera module when the effective imaging area formed by the free-form optics needs to correspond to the imaging area of the sensor chip. It's difficult to observe the direction of the effective imaging area of the free-form surface when camera lenses with free-form optics are assembled, thus bringing difficulties to assembly. When the lens assembly of the camera module is in the process, due to the presence of free-form optics, it requires not only to move and tilt in the plane direction, but also to correspond the effective imaging area to the imaging area of the sensor chip, thus need to adjust by rotation. In the prior art, the assembly speed of the camera lens with free-form optics is limited by the adjustment of the position of the free-form optic lens, which makes it difficult to improve the assembly speed.

On the other hand, for camera modules capable of autofocus (i.e. camera modules with motors), in the existing assembly process of ordinary camera modules, the motor is first attached to the camera lens with fixed height, and in the auto focusing process, the device clamps the motor and the camera lens as a whole and the photosensitive assembly for adjustment. And when the camera lens set with free-form optic lens is still assembled in accordance with the above-mentioned way, it is easy to cause the motor housing to be misaligned with the circuit board after rotational adjustment, thus causing the poor appearance of the camera module.

SUMMARY OF THE INVENTION

A major advantage of the present invention is to provide a camera module, a camera lens with mark and a manufacturing method of the same, and an assembly method of an extra-wide-angle camera module, wherein the camera lens is a camera lens with mark to identify the position of an imaging surface formed by the camera lens, which is conducive to simplifying the assembly of the camera module.

Another advantage of the present invention is to provide a camera module, a camera lens with mark and a method for manufacturing the same, and an assembly method of an extra-wide-angle camera module, wherein the camera lens includes at least a first lens unit, and an effective diameter of the first lens unit is identified by means of marking, so as to assemble the camera lens according to the effective diameter of the first lens unit.

Another advantage of the present invention is to provide a camera module, a camera lens with mark and a method for manufacturing the same, and an assembly method of an extra-wide-angle camera module, wherein the camera lens includes a mark element, wherein the mark element is provided in a lens tube of the camera lens, and the effective diameter of the first lens unit in the camera lens is identified by the location of the mark element, so as to assemble the camera lens according to the effective diameter.

Another advantage of the present invention is to provide a camera module, a camera lens with mark and a manufacturing method thereof, and an assembly method of an extra-wide-angle camera module, wherein the camera lens identifies the effective diameter, which facilitates simplifying the assembly process steps of the camera module, realizing a rapid assembly of a camera module with a first lens unit, and improving the production processing efficiency of the camera module.

Another advantage of the present invention is to provide a camera module, a camera lens with mark and a manufacturing method thereof, and an assembly method of an extra-wide-angle camera module, wherein a motor of the camera module is assembled orientedly according to the mark element, in order that the camera lens is oriented to the motor and making the appearance of the module meets the requirements.

Another advantage of the present invention is to provide a camera module, a camera lens with mark and a method for manufacturing the same, and an assembly method of an extra-wide-angle camera module, wherein the camera lens simplifies the process of calibrating the optical system of the camera module, using the adjustment of the optical system itself and reducing the design of distortions, so that the calculation of the image calibration process of the camera module and the image loss are reduced.

Another advantage of the present invention is to provide a camera module, a camera lens with mark and a method for manufacturing the same, and an assembly method of an extra-wide-angle camera module, wherein the mark element of the camera lens is provided in the lens tube, which facilitates the positioning of a visual identification device to identify the camera lens according to the location of the mark element, and facilitates the automation and intelligence of the assembly process.

Another advantage of the present invention is to provide a camera module, a camera lens with mark and a manufacturing method thereof, and an assembly method of an extra-wide-angle camera module, wherein the mark element is formed on the lens surface of the camera lens by means of a hole or a raised marking point provided at a specific position, simplifying the processing and manufacturing process of the lens.

Another advantage of the present invention is to provide a camera module, a camera lens with mark and a manufacturing method thereof, and an assembly method of an extra-wide-angle camera module, wherein the assembly method is to visually identify the mark of the extra-wide-angle camera module, and to assemble a lens assembly and a photosensitive assembly of the extra-wide-angle camera module according to the position of the mark, which is conducive to improving the yield of the extra-wide-angle camera module.

Another advantage of the present invention is to provide a camera module, a camera lens with mark and a manufacturing method thereof, and an assembly method of an extra-wide-angle camera module, wherein the position of the mark is visually identified and the position of a target surface formed by the lens assembly is calculated according to the position of the mark, in order to identify that during the assembly process, making the target surface of the optical system corresponds to the photosensitive area of the photosensitive element and the rate of good products is improved.

Another advantage of the present invention is to provide a camera module, a camera lens with marker and a method for manufacturing the same, and an assembly method of an extra-wide-angle camera module by visually identifying the position of the mark to mount the camera lens on the motor in an oriented manner, and by identifying the position of the markers to make the motor housing orientation correspond to the circuit board orientation.

Another advantage of the present invention is to provide a camera module, a camera lens with mark and a method for manufacturing the same, and an assembly method of an extra-wide-angle camera module, wherein in an active focusing process, the lens assembling method visually identifies the position of the mark, and according to the position of the mark, adapts the camera lens to the motor orientation, uses the orientation of the sensor attachment to adapt the rectangular orientation of the circuit board, so that after the active focusing adjustment, when the effective diameter is adapted to the light-sensitive area of the photosensitive element, the motor direction and the circuit board direction also adapt the process.

Another advantage of the present invention is to provide an assembly method of an extra-wide-angle camera module, wherein the camera lens includes at least one free-form optic lens, and an effective diameter of the free-form optical lens is identified by means of marking so as to assemble the camera lens according to the effective diameter of the free-form optic lens.

Another advantage of the present invention is to provide a camera module, a camera lens with mark and a method for manufacturing the same, and an assembly method of an extra-wide-angle camera module, wherein the mark element is formed outside the effective diameter portion of the free-form optical lens by means of painting black, plating black or attaching a black identifiable mark so as to identify the effective diameter portion of the free-form optical lens by means of a machine vision identification system.

Another advantage of the present invention is to provide a camera module, a camera lens with mark and a method for manufacturing the same, and an assembly method of an extra-wide-angle camera module, wherein the mark element having light blocking properties is provided on the outside of the structured light portion corresponding to the free-form optical lens, and the position and shape of the target surface formed by the camera lens is identified by the mark element, and stray light entering into the lens tube is blocked by the mark element.

Another advantage of the present invention is to provide a camera module, a camera lens with mark and a manufacturing method thereof and an assembly method of an extra-wide-angle camera module, wherein the mark element may be implemented as a mark slot, and the mark slot is formed on a lens of the lens assembly, and the direction of the effective diameter of the free-form optical lens can be marked by the position of the visually identifiable mark slot, in favor of simplifying the processing and manufacturing process.

Another advantage of the present invention is to provide a camera module, a camera lens with mark and a manufacturing method thereof, and an assembly method of an extra-wide-angle camera module, wherein the camera lens marks the effective diameter, which facilitates simplifying the process steps of assembling the extra-wide-angle camera module, realizing rapid assembly of an extra-wide-angle camera module with free-form optic lens, and improving the production and processing efficiency of the extra-wide-angle camera module.

Another advantage of the present invention is to provide a camera module, a camera lens with mark and a manufacturing method thereof, and an assembly method of an extra-wide-angle camera module, wherein the assembly device of the camera module determines the mounting direction of the camera lens by visually identifying the mark element, which facilitates simplifying the mounting steps and improving the accuracy of mounting.

Other advantages and features of the present invention are fully embodied by the following detailed description and may be realized by the combination of means and apparatus specifically markd in the appended claims.

In accordance with an aspect of the present invention, the present invention provides a lens including:

a lens tube;

at least one first lens unit and at least one second lens unit, wherein the first lens unit and the second lens unit are provided in the lens tube, and the first lens unit is a non-rotational member; and at least one mark element, wherein the mark element is provided in the lens tube, and the mark element is used to position the first lens unit.

According to an example of the present invention, the mark element has a fixed predetermined angle to the first lens unit so that the position and angle of the first lens unit are determined according to the mark element.

According to an example of the present invention, the first lens unit includes an effective diameter portion and a structural portion, wherein the structural portion extends outwardly from the effective diameter portion, and according to the effective diameter portion of the first lens unit, the mark element is provided on the lens tube corresponding to a specific position at a distance from the effective diameter portion, such that the mark element marks the position and orientation of the effective diameter portion.

According to an example of the present invention, the first lens unit includes an effective diameter portion and a structural portion, wherein the structural portion extends outwardly from the effective diameter portion, and the first lens unit is adjusted according to the location of the mark element in order that the effective diameter portion of the first lens unit is located at a specific position from the mark element, such that the mark element marks the effective diameter portion.

According to an example of the present invention, the mark element is integrally provided on the lens tube, and the mark element is a raised structure.

According to an example of the present invention, the mark element further includes a mark body and is further provided with at least one mark slot, and the mark body is integrally molded on the lens tube, and the mark slot is formed on the mark body in order to identify the mark element by means of visual identification of the mark slot.

According to an example of the present invention, the mark element further includes a mark body and is further provided with at least one cut edge, and the mark body is integrally molded on the lens tube, wherein the cut edge is formed on the mark body in order to identify the mark element by means of visual identification of the cut edge.

According to an example of the present invention, the mark element is a coating, the mark element is affixed to the lens tube.

According to an example of the present invention, the lens tube further includes a lens tube body and a lens mounting cavity, wherein the first lens unit and the second lens unit are fixed to the lens mounting cavity by the lens tube body, and the lens tube body further includes a lens tube upper end portion and a lens tube lower end portion, and the mark element is provided in the lens tube lens tube upper end portion body.

According to an example of the present invention, the lens tube further includes a lens tube body and a lens mounting cavity, wherein the first lens unit and the second lens unit are fixed to the lens mounting cavity by the lens tube body, and the lens tube body further includes a lens tube upper end portion and a lens tube lower end portion, and the mark element is provided at the lens tube lower end portion of the lens tube body.

According to an example of the present invention, the lens tube body of the lens tube has a lens tube outer sidewall, and the mark element is provided on the lens tube outer sidewall of the lens tube body.

According to another aspect of the present invention, the present invention provides a camera module including;

a photosensitive assembly; and a lens, wherein the lens is provided in the photosensitive assembly, and the lens further includes:

a lens tube;

at least one first lens unit and at least one second lens unit, wherein the first lens unit and the second lens unit are provided in the lens tube, and the first lens unit is a non-rotational member; and at least one mark element, wherein the mark element is provided in the lens tube, and the mark element is used to position the first lens unit.

According to an example of the present invention, the photosensitive assembly includes a circuit board, a photosensitive element, wherein the photosensitive element is provided conductively on the circuit board, and the camera lens is provided in the light-sensing path of the photosensitive element.

According to an example of the present invention, the first lens unit and the second lens unit form an imaging surface on an upper surface of the photosensitive element, and the mounting positions of the lens and the photosensitive assembly are adjusted according to the position and angle of the imaging surface.

According to an example of the present invention, further includes a lens fixing component, wherein the lens tube of the camera lens is orientedly fixed to the lens fixing component according to the location of the mark element, and the corresponding position of the imaging surface to the photosensitive imaging area of the photosensitive element is identified by the visually identified location of the mark element, and the lens fixing component is thereby adjusted so that the imaging surface is adapted to the photosensitive imaging area of the photosensitive element.

According to an example of the present invention, further includes a motor and a motor housing, wherein the orientation of the mark element of the lens tube and the orientation of the motor housing have a fixed pre-determined angle.

According to an example of the present invention, the first lens unit includes an effective diameter portion and a structural portion, wherein the structural portion extends outwardly from the effective diameter portion, and based on the effective diameter portion of the first lens unit, the mark element is provided at a distance from the effective diameter portion corresponding to a specific position of the lens tube, such that the mark element marks the effective diameter portion.

According to an example of the present invention, the first lens unit includes an effective diameter portion and a structural portion, wherein the structural portion extends outwardly from the effective diameter portion, and the first lens unit is adjusted according to the position of the mark element so that the effective diameter portion of the first lens unit is located at a specific position from the mark element, such that the mark element marks the effective diameter portion.

According to another aspect of the present invention, the present invention provides a manufacturing method of a camera lens including the following steps.

(a) providing at least one mark element in a lens tube.

(b) assembling at least one first lens unit and at least one second lens unit in the lens tube, wherein the first lens unit includes an effective diameter portion and a structural portion; and (c) adjusting the position of the at least one first lens unit to a particular location of the mark element according to the location of the mark element, such that the mark element marks the effective diameter portion of the first lens unit.

According to an example of the present invention, in the step (a), the mark element is formed on a lens tube body of the lens tube and the mark element is a projection integrally molded on the lens tube body.

According to an example of the present invention, in the step (a), the mark element is formed on a lens tube body of the lens tube, and the mark element includes a mark body and a mark slot formed on the mark body.

According to an example of the present invention, in the step (a), the mark element is provided at a lens tube upper end portion of the lens tube body.

According to an example of the present invention, in the step (a), the mark element is provided on a lens tube lower end portion of the lens tube body.

According to another aspect of the present invention, the present invention provides an assembly method of an extra-wide-angle camera module, which includes the following steps:

(a) photographing a lens assembly being clamped, and identifying at least one mark element of a camera lens of the lens assembly based on a visual identification system, and determining the orientation of an effective diameter portion of a free-form optical lens of the camera lens according to the identified mark element;

(b) energizing a photosensitive assembly, and acquiring image information captured by the photosensitive assembly;

(c) adjusting the position of the lens assembly relative to the photosensitive assembly based on the captured image information in order that a target surface formed by the camera lens covers the photosensitive imaging area of the photosensitive assembly and the photosensitive assembly images clearly; and (d) fixing the lens assembly and the photosensitive assembly.

According to an example of the present invention, wherein the mark element is a projection integrally molded on a lens tube, and the mark element marks the position and orientation of the effective diameter portion of the free-form optical lens.

According to an example of the present invention, wherein the mark element is a slot integrally molded on a lens tube, and the mark element marks the position and orientation of the effective diameter portion of the free-form optical lens.

According to an example of the present invention, wherein the mark element is coated on the free-form optical lens of the camera lens, and the shape of the mark element is adapted to the effective diameter portion, and the mark element marks the position and orientation of the effective diameter portion of the free-form optical lens.

According to an example of the present invention, wherein the mark element is coated on a lens unit of the camera lens, and the shape of the mark element is adapted to the effective diameter portion, and the mark element marks the position and orientation of the effective diameter portion of the free-form optical lens.

According to an example of the present invention, wherein the mark element is a mark slot formed in a lens tube of the lens, and the mark element marks the position and orientation of the effective diameter portion of the free-form optical lens.

According to an example of the present invention, wherein the mark element is a mark slot formed in the free-form optical lens, and the mark element marks the position and orientation of the effective diameter portion of the free-form optical lens.

According to an example of the present invention, further including steps before the step (a) of the assembly method:

(a0.1) identifying the mark element of the camera lens and an outer contour of a motor housing; and (a0.2) fixing the camera lens to the motor housing in such a way that the effective diameter portion of the free-form optical lens is oriented to fit the outer contour of the motor housing.

According to an example of the present invention, wherein the step (a0.2) further includes the following steps:

calculating a rotation angle difference between the orientation of the effective diameter portion of the camera lens and the outer contour of the motor housing according to the location of the mark element;

rotating the lens tube of the camera lens in order that one side of the effective diameter portion is parallel to one side of the motor housing; and dispensing and curing the camera lens with a motor making the lens assembled parallel to the motor housing.

According to an example of the present invention, wherein in the step (a), further including the following steps:

(a.1) photographing the photosensitive assembly, and identifying the position of a photosensitive element of the photosensitive assembly; and (a.2) initially adjusting the lens assembly according to the position and orientation of the effective diameter portion of the camera lens and the position of the photosensitive element in order that an edge of the effective diameter portion is substantially parallel to the contour of the photosensitive element.

According to an example of the present invention, wherein the step (b) further includes the following steps:

controlling a device for clamping the lens assembly to rotate a certain angle; and recording an image taken by the photosensitive assembly during the rotation of the lens assembly.

According to an example of the present invention, wherein the step (b) further includes the following steps:

controlling the device for clamping the lens assembly to translate in the x/y direction; and recording an image taken by the photosensitive assembly during the translation of the lens assembly.

According to an example of the present invention, wherein the step (c) further includes the following steps:

(c.1) processing the acquired image, and capturing the imaging boundary of the photosensitive element; and (c.2) determining the correction direction of the lens assembly and the imaging boundary of the photosensitive element based on the change in a dark corner area of the image boundary, and calculating a correction angle of the lens assembly.

According to an example of the present invention, wherein the step (c) further includes the following steps:

(c.3) driving the lens assembly to rotate directionally based on the calculated correction angle in order that the edge of the effective diameter portion is parallel and corresponding to the edge of the light sensor in the vertical direction; and (c.4) translating and tilting the lens assembly according to the captured image information in order that a target surface area formed by the camera lens of the lens assembly covers the photosensitive imaging area of the photosensitive element and the photosensitive element acquires a clear image.

Further objects and advantages of the present invention will be fully embodied by an understanding of the subsequent description and the drawings.

These and other objects, features and advantages of the present invention are fully embodied by the following detailed description, the drawings and the claims.

BRIEF DESCRIPTION OF THE DRAWINGS

FIG. 15 is a schematic diagram of the assembly method steps of the extra-wide-angle camera module according to the above-described preferred example of the present invention.

DETAIL DESCRIPTION OF THE INVENTION

Figure 1:
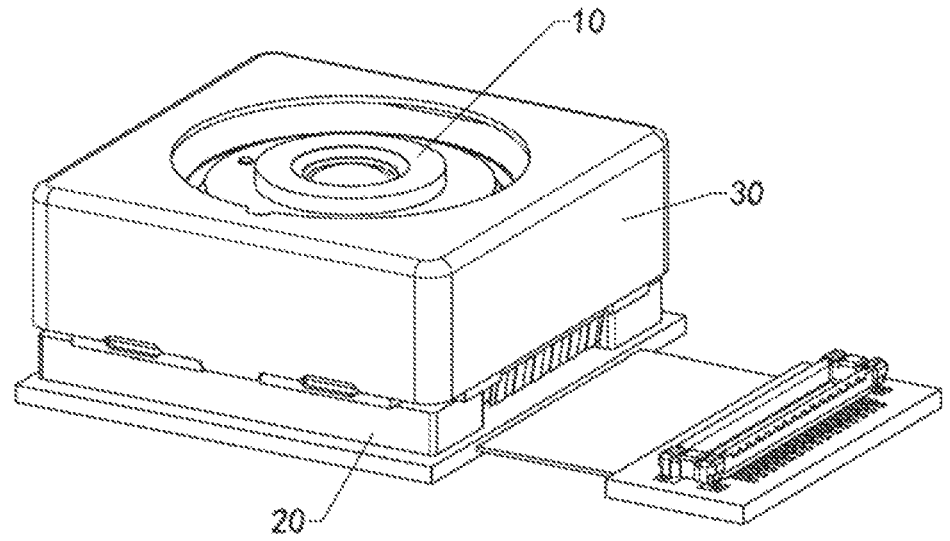
FIG. 1 is an overall schematic diagram of a camera module according to a first preferred example of the present invention.

The following description is used to disclose the present invention to enable those skilled in the art to implement the invention. The preferred examples in the following description are intended as examples only, and other obvious variations can be thought of by those skilled in the art. The basic principles of the present invention as defined in the following description may be applied to other examples, variations, improvements, equivalents, and other technical solutions that do not depart from the spirit and scope of the present invention.

It should be understood by those skilled in the art that in the disclosure of the present invention, the terms "longitudinal", "transverse", "up", "down", "front", "back", "left", "right", "vertical", "horizontal", "top", "bottom", "inside", "outside", etc., mark an orientation or positional relationship based on the orientation or positional relationship shown in the drawings, and are intended only to facilitate and simplify the description of the invention, and do not mark or imply that the device or element referred to must have a particular orientation, be constructed and operate in a particular orientation, and therefore the above terms are not to be construed as limitations of the invention.

It is understood that the term "one" is to be understood as "at least one" or "one or more", i.e., in one example the number of elements may be one, while in another example the number of elements may be more than one, and the term "one" is not to be understood as a limitation of the number.

Referring to FIGS. 1 to 6 of the drawings of the specification of the invention, a camera module in accordance with a first preferred example of the invention is set forth in the following description. The camera module includes a camera lens 10, a photosensitive assembly 20, and a lens fixing component 30, wherein said camera lens 10 is fixedly provided in said lens fixing component 30, and based on the imaging properties of said photosensitive assembly 20, said lens fixing component 30 fixes said camera lens 10 at said photosensitive assembly 20 in the condition that said photosensitive assembly 20 is energized. Said camera lens 10 has a marking function, wherein said camera lens 10 is oriented to said lens fixing component 30 according to the marking position of said camera lens 10, and the relative position of said camera lens 10 to said photosensitive assembly 20 is adjusted by means of adjusting the position of said lens fixing component 30.

Said camera lens 10 corrects distortions generated by imaging light projected into the field range of the camera module of said photosensitive assembly 20, said camera lens 10 forming an imaging surface 101 at a position corresponding to said photosensitive assembly 20, wherein the shape of said imaging surface 101 is adapted to the imaging area of said photosensitive assembly 20, in order that the field curvature and distortion of said camera module is amended by correcting said camera lens 10. In other words, when said camera lens 10 is mounted, said camera lens 10 is fixed to said photosensitive assembly 20 by said lens fixing component 30 in a manner that the shape of said imaging surface 101 is adapted to the shape of the imaging area of said photosensitive assembly 20.

Figure 2A:
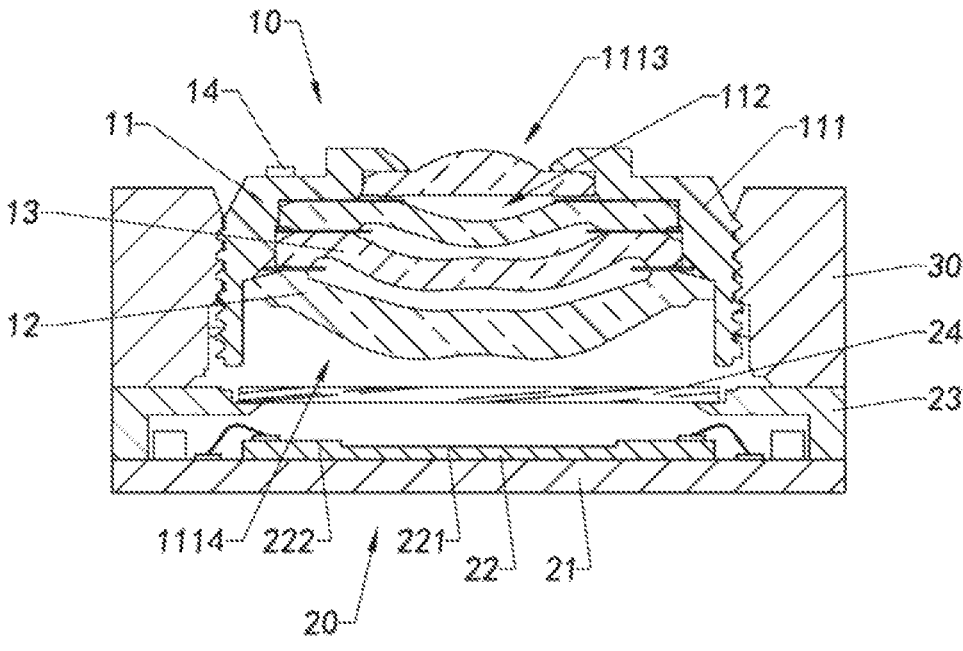
FIG. 2A is a cross-sectional view of said camera module according to the above-described preferred example of the present invention.

As shown in FIG. 2A, said camera lens 10 includes a lens tube 11, at least one first lens unit 12, at least one second lens unit 13, and at least one mark element 14, wherein said at least one first lens unit 12 and said at least one second lens unit 13 are sequentially stacked in said lens tube 11, and said first lens unit 12 and the second lens unit 13 are fixed by said lens tube 11. Said mark element 14 is provided in the lens tube 11, and the position of said imaging surface 101 of said camera lens 10 is markd by said mark element 14. By visually identifying the location of said mark element 14, said camera lens 10 is fixed directionally to said lens fixing component 30, i.e. The lens tube 11 of said camera lens 10 is fixed to said lens fixing component 30 according to the location of said mark element 14. When said camera lens 10 is fixed to said lens fixing component 30, said mark element 14 is located at a specific position of said lens fixing component 30 so that the relative position of said lens fixing component 30 and said photosensitive assembly 20 is adjusted by visual identification of said mark element 14.

Said photosensitive assembly 20 includes a circuit board 21, a photosensitive element 22, a lens holder 23, and at least one optical filter 24, wherein said photosensitive element 22 is provided conductively on said circuit board 21, and said lens holder 23 is provided on said circuit board 21, and said optical filter 24 is affixed to said lens holder 23. Said photosensitive element 22 of said photosensitive assembly 20 has a photosensitive imaging area 221 and a non-photosensitive imaging area 222 surrounding said photosensitive imaging area 211, and by adjusting the relative position of said lens fixing component 30 and said photosensitive assembly 20, the shape of said imaging surface 101 formed by said lens 10 adapts to the shape of said photosensitive imaging area 221.

It is worth mentioning that said camera lens 10 forms said imaging surface 101 on an upper surface of said photosensitive element 22, wherein the size of said imaging surface 101 is slightly larger than the size of said photosensitive imaging area 221 of said photosensitive element 22 in order to make full use of said photosensitive element 22 as well as to reserve a certain fitting allowance.

It can be understood by those skilled in the art that at least one surface of said first lens unit 12 of said camera lens 10 is free-form, i.e. The first lens unit 12 is a non-rotationally symmetrical lens. Thus, said imaging surface 101 formed by said first lens unit 12 is a non-circular area, i.e. said camera lens 10 corrects the field curvature and distortion of said camera module, and the area incident to the upper surface of said photosensitive element 22 is of a non-rotationally symmetrical shape. Since said lens tube 11 of said camera lens 10 is rotationally symmetric, when said camera lens 10 is rotated, said imaging surface 101 formed by said camera lens 10 on said photosensitive element 22 rotates with said camera lens 10.

Preferably, in this preferred example of the present invention, said imaging surface 101 formed by said camera lens 10 is a rectangular surface adapted to the shape of said photosensitive element 22, it can be understood by those skilled in the art that the shape of said imaging surface 101 of said camera lens 10 is related to the optical characteristics of said first lens unit 12 of said camera lens 10, i.e. that said imaging surface 101 formed by said lens 10 is used herein only as exemplary and not as a limitation. Thus, in other examples of the present invention, said imaging surface 101 formed by said camera lens 10 may also be implemented in other shapes.

When said lens fixing component 30 and said photosensitive assembly 20 are adjusted to be fixed, the relative position of said imaging surface 101 to said photosensitive imaging area 221 of said photosensitive element 22 is visually identified by the location of said mark element 14, and in turn said lens fixing component 30 is adjusted or said photosensitive assembly 20 is adjusted so that said imaging surface 101 is adapted to said photosensitive imaging area 221 of said photosensitive element 22.

Specifically, during assembly of said camera module, said photosensitive assembly 20 is illuminated, wherein said photosensitive assembly 20 is fixed while adjusting and fixing the relative position of said lens fixing component 30 to said photosensitive assembly 20; or said lens fixing component 30 is fixed while adjusting and fixing the relative position of said photosensitive assembly 20 to said lens fixing component 30. The assembly device visually identifies said mark element 14 and determines the position and shape of said imaging surface 101 formed by said camera lens 10 according to the location of said mark element 14. In a state where said photosensitive assembly 20 is illuminated, the relative positions of said photosensitive assembly 20 to said lens fixing component 30 are adjusted according to the position of the mark element 14 such that said imaging surface 101 formed by said camera lens 10 covers said photosensitive imaging area 221 of said photosensitive element 22.

It is worth mentioning that as said first lens unit 12 of said camera lens 10 of the camera module is a non-rotationally symmetrical body, during the adjusting process, it requires a "shift" and a "tilt" of said lens fixing component 30 or said photosensitive assembly 20, i.e., to translate in the x- and y-axis directions and tilting in the z-axis direction, so that the optical axis of said camera lens 10 is perpendicular to said photosensitive element 22 and the optical center of said camera lens 10 is at the center of said photosensitive imaging area 221. In addition, there is a need to consider "rotation" when actively focusing, i.e. to adapt said imaging surface 101 formed by said camera lens 10 to the shape of said photosensitive imaging area 221 of said photosensitive element 22, and the assembly device adjusts said photosensitive assembly 20 or said lens fixing component 30 to guarantee that said imaging surface 101 formed by said camera lens 10 covers said photosensitive element 22 of said photosensitive imaging area 221.

When said imaging surface 101 formed by said camera lens 10 is rectangular, it is adjusted so that the long side of said imaging surface 101 corresponds to the long side of said photosensitive imaging area 221 and the short side of said imaging surface 101 corresponds to the short side of said photosensitive imaging area 221. Preferably, said camera lens 10 is directionally fixed to said lens fixing component 30 according to the visually identifiable mark element 14, and when said lens fixing component 30 and said photosensitive assembly 20 are adjusted and mounted, said imaging surface 101 formed by said camera lens 10 can then cover said photosensitive imaging area 221 of said photosensitive element 22.

Figure 2B:
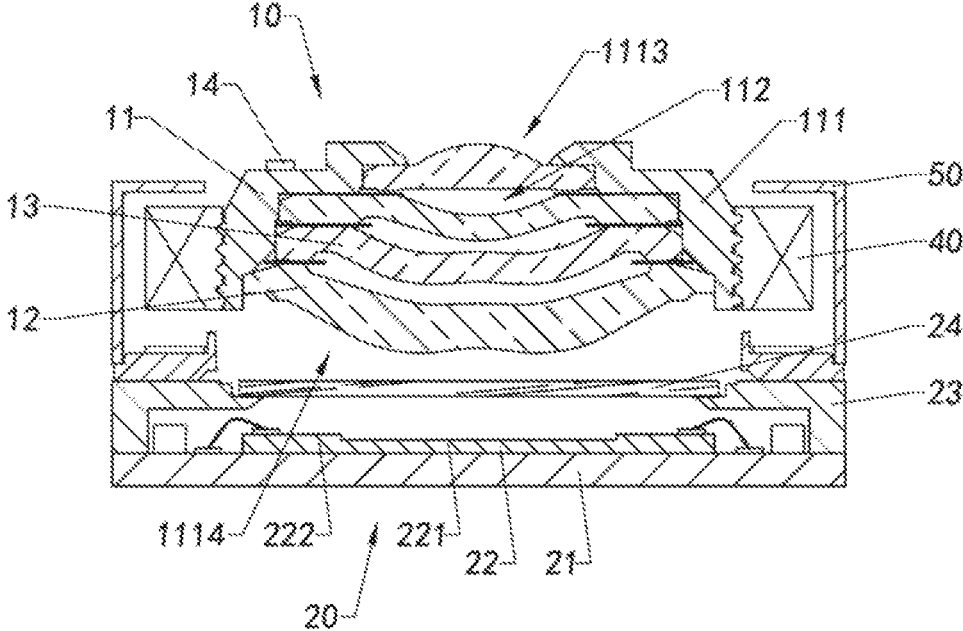
FIG. 2B is a cross-sectional view of another alternative example of said camera module according to the above-described preferred example of the present invention.
Figure 3:
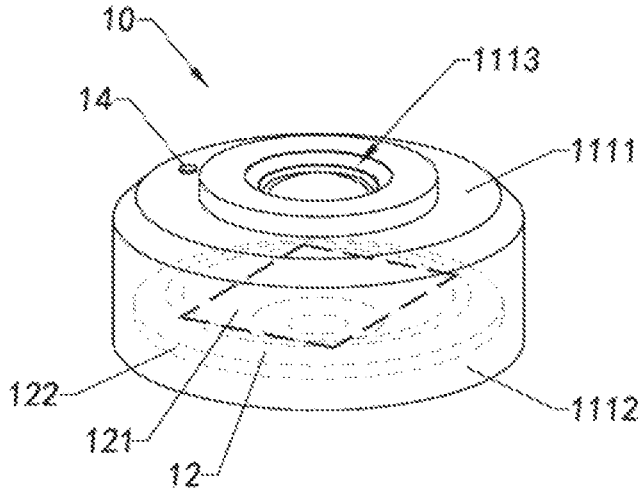
FIG. 3 is an overall schematic view of a camera lens of said camera module according to the above-described preferred example of the present invention.
Figure 4:
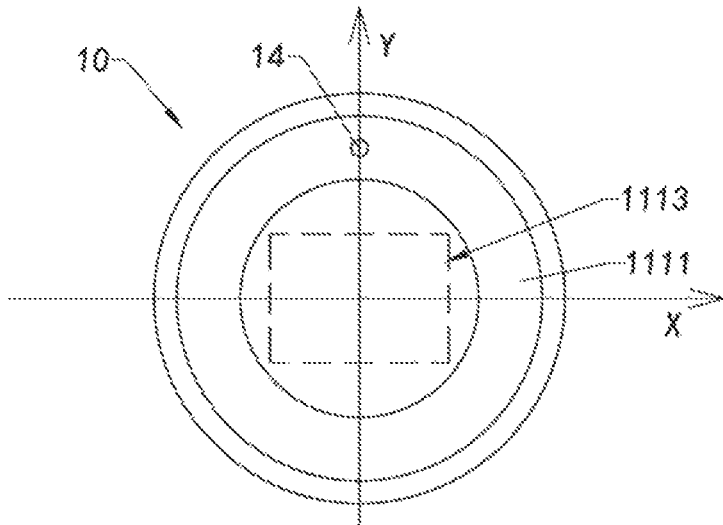
FIG. 4 is a top view of the camera lens of the camera module according to the above-described preferred example of the present invention.
Figure 5:
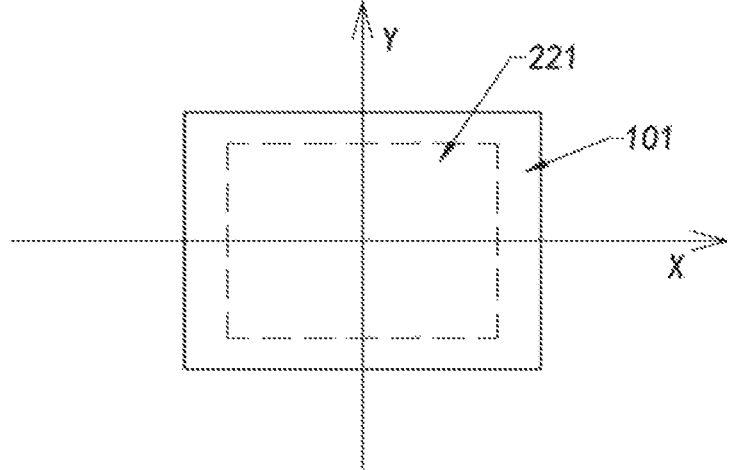
FIG. 5 is a schematic view of an imaging surface formed by the camera lens of the camera module according to the above-described preferred example of the present invention.
Figure 6:
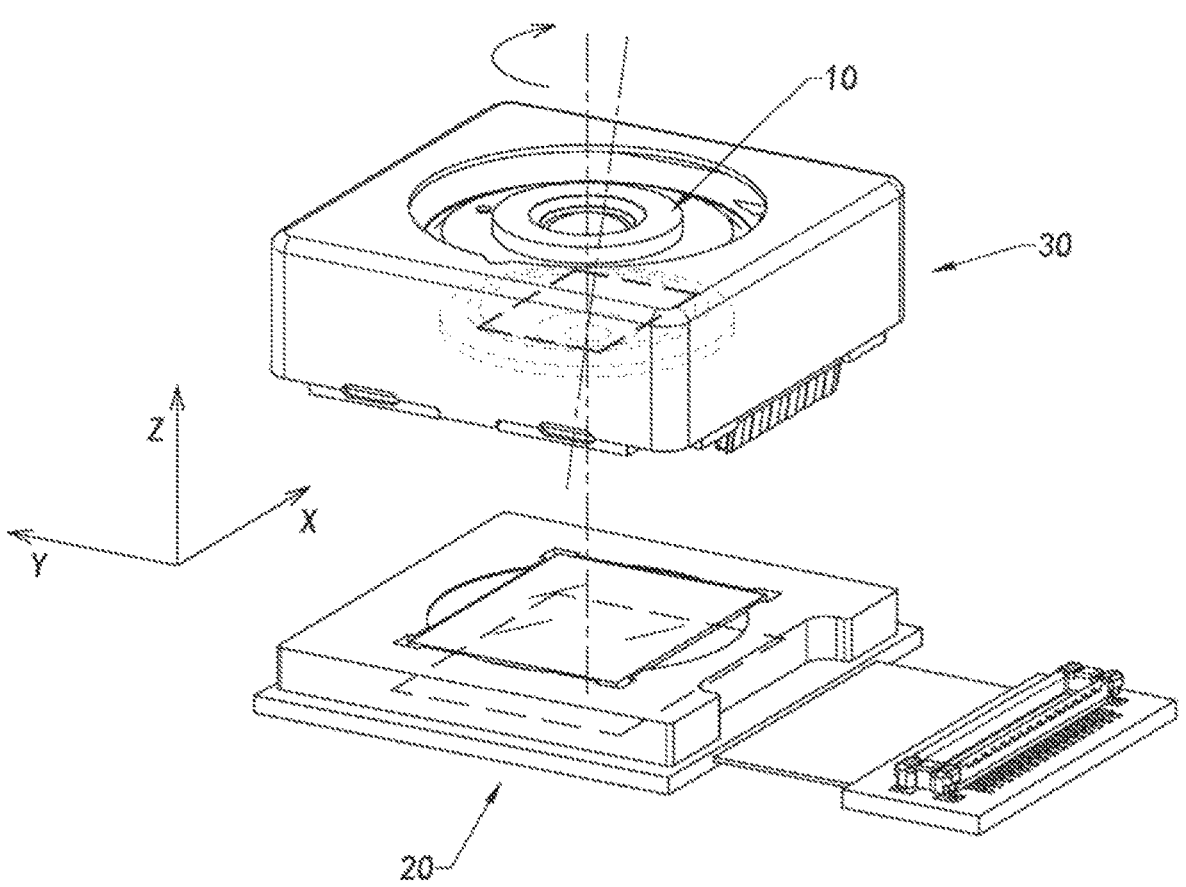
FIG. 6 is a schematic diagram of the assembly of the camera module according to the above-described preferred example of the present invention.

As shown in FIG. 2B, according to another aspect of the present invention, said camera module of the present invention may also be implemented as a camera module capable of autofocusing, i.e. a camera module with a motor. Accordingly, said camera module includes a camera lens 10, a photosensitive assembly 20, at least one motor 40 and a motor housing 50, wherein said camera lens 10 is drivably connected to said motor 40, and said motor 40 drives the movement of said camera lens 10 based on said motor housing 50 to adjust the focus position of said camera lens 10.

Said camera lens 10 is fixed in height by said motor 40 to said motor housing 50, and said motor housing 50 fixes said camera lens 10 to said photosensitive assembly 20. While said camera lens 10 is fixed to said motor housing 50, said camera lens 10 is set directionally in said motor housing by said motor 40 according to the position of the mark element 14. After said camera lens 10 is fixed in height to said motor housing 50, said motor housing 50 is adjusted and fixed to said photosensitive assembly 20 according to the location of said mark element 14, said imaging surface 101 formed by said camera lens 10 covers said photosensitive imaging area 221 of said photosensitive element 22 and said motor housing 50 is adapted to said photosensitive assembly 20. In other words, when said imaging surface 101 covers said photosensitive imaging area 221, said motor housing 50 is fixed to said photosensitive assembly 20, wherein said motor housing 50 is fixed in a position adapted to said photosensitive assembly 20 to avoid misalignment of said motor housing 50 with said circuit board 21 of said photosensitive assembly 20 which results in a poor appearance of said camera module.

An alternative example of said camera lens 10 of said camera module of the present invention is illustrated in FIGS. 3 to 6. The lens tube 11 includes a lens tube body 111 and a lens mounting cavity 112 formed in the lens tube body 111, wherein the second lens unit 13 and said first lens unit 12 are fixed to said lens mounting cavity 112 by the lens tube body 111. The mark element 14 is provided in the lens tube body 111 of the lens tube 11, and by visual identification of the positon of the mark element 14, the approximate position and shape of said imaging surface 101 formed by said lens 10 is determined.

It can be understood that the mark element 14 is integrally molded on the lens tube body 111, wherein said first lens unit 12 and the second lens unit 13 are fixedly mounted in said lens mounting cavity 112 according to the location of the mark element 14 so that the approximate location and shape of said imaging surface 101 formed by said camera lens 10 is determined by the location of the mark element 14. It readily occurs to those skilled in the art that, after said first lens unit 12 and the second lens unit 13 are mounted in said lens mounting cavity 112 of the lens tube 11, the mark element 14 is provided in the lens tube body 111 according to said imaging surface 101 formed by said camera lens 10, so that the approximate position and shape of said imaging surface 101 formed by said camera lens 10 is determined according to the visually identified mark element 14.

The lens tube body 111 of the lens tube 11 further includes a lens tube upper end portion 1111 and a lens tube lower end portion 1112 extending integrally downwardly from the lens tube upper end portion 1111, wherein the lens tube upper end portion 1111 defines an upper opening 1113 of the lens tube 11 and the lens tube lower end portion 1112 defines a lower opening 1114 of the lens tube 11, wherein said lens mounting cavity 112 connects said upper opening 1113 and said lower opening 1114.

In this preferred example of the present invention, said mark element 14 is provided at said upper end portion 1111 of said lens tube body 111 so that the assembly device visually identifies the location of said mark element 14 at the upper end of the lens tube 11 to identify the location and shape of said imaging surface 101 formed by said camera lens 10. Preferably, in this preferred example of the present invention, the mark element 14 is implemented as a projection, wherein the mark element 14 is integrally molded in said upper end portion 1111 of said lens tube body 111.

The first lens unit 12 includes an effective diameter portion 121 and a structural portion 122, wherein said effective diameter portion 121 is located on the inner side of said structural portion 122, wherein external light reaches said imaging surface 101 via said effective diameter portion 121 and external light reaches the outer side of said imaging surface 101 via said structural portion 122. In short, said effective diameter portion 121 of said first lens unit 12 corresponds to the position of the area of said imaging surface 101 formed by said camera lens 10. Accordingly, said mark element 14 is used to mark the position and shape of said effective diameter portion 121 of said first lens unit 12. Exemplarily, in this preferred example of the present invention, said effective diameter portion 121 of said first lens unit 12 is projected along the optical axis direction in the shape of a rectangle.

Preferably, said mark element 14 is provided at said upper end portion 1111 of the lens tube, wherein at least one of said mark elements 14 corresponds to the position of the intersection of the medial axis surface of said long or short side of said effective diameter portion 121 of said first lens unit 12 with the lens tube 111. It readily occurs to those skilled in the art that the position and number of said mark elements 14 are provided herein only as exemplary, and not as limiting. That is, the vision system visually identifies the location of said mark elements 14 relative to the lens tube body 111 to determine said effective diameter portion 121 of said first lens unit 12, and thus the position and shape of said imaging surface 101. It readily occurs to those skilled in the art that said effective diameter portion 121 of said first lens unit 12 can be determined by the positon of two or more of said mark elements 14 arranged in the lens tube body 111, and thus the position and shape of said imaging surface 101 are determined.

Said mark element 14 projects from said upper end portion 1111 of the lens tube of said lens tube body 111, wherein the height of said mark element 14 is between 0.1 and 0.3 mm.

Figure 7A:
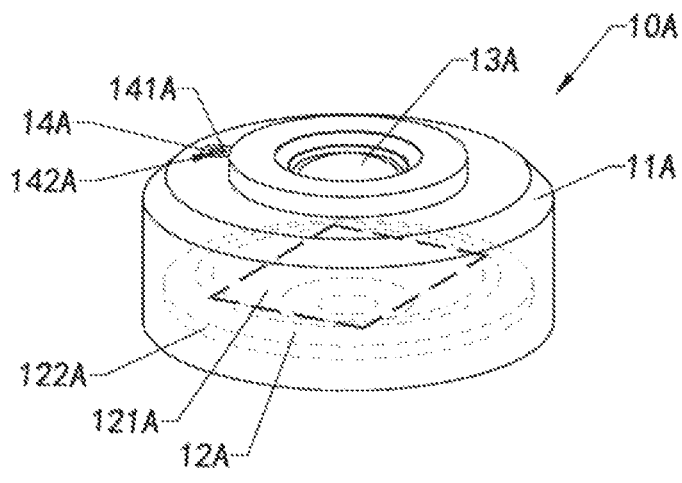
FIG. 7a is a schematic diagram of another alternative example of a camera lens of the camera module according to the above-described preferred example of the present invention.

Several other alternative examples of said camera lens 10 are illustrated with reference to FIGS. 7A to 7E of the drawings of the specification of the present invention. As shown in FIG. 7A, a camera lens 10A of said camera module according to the above-described preferred example of the present invention is set forth in the description that follows. Said camera lens 10A includes a lens tube 11A, at least one first lens unit 12A, at least one second lens unit 13A and at least one mark element 14A, wherein said at least one first lens unit 12A and said at least a second lens unit 13A are sequentially stacked in said lens tube 11A, with said first lens unit 12A and said second lens unit 13A fixed by said lens tube 11A. What is unlike the above preferred example is said mark element 14A of said lens 10A, said mark element 14A is provided in the lens tube 11A in order that said mark element 14A is used to determine the position and shape of an imaging surface 101 of said lens 10A.

Said mark element 14A includes a mark body 141A and is further provided with at least one mark slot 142A, wherein said mark slot 142A is formed in said mark body 141A. Said mark body 141A of said mark element 14A is integrally molded on the lens tube 11A. In this preferred example of the present invention, said mark body 141A of said mark element 14A is integrally molded on the lens tube 11A. Mark body 141A is integrally molded on the lens tube 11A, wherein said mark slot 142A is visually identifiable so that according to the position of said slot 142A, the location and shape of an imaging surface 101 of said lens 10A is determined. Preferably, said mark slot 142A has a depth of between 0.1 and 0.3 mm.

Figure 7B:
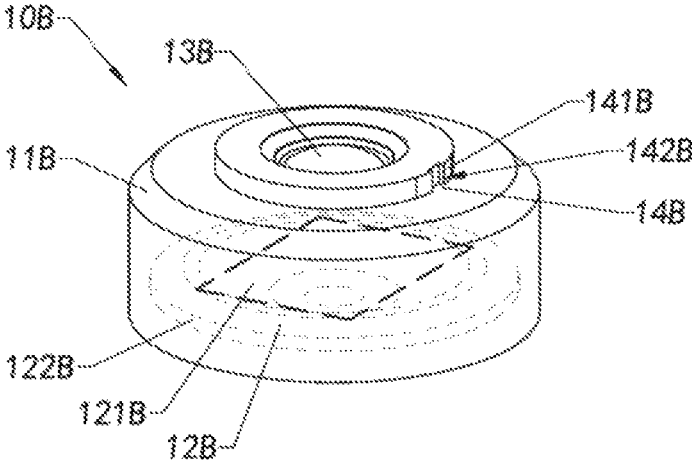
FIG. 7B is a schematic diagram of another alternative example of a camera lens of the camera module according to the above-described preferred example of the present invention.

As shown in FIG. 7B, a camera lens 10B of said camera module according to the above-described preferred example of the present invention is set forth in the description that follows. Said camera lens 10B includes a lens tube 11B, at least one first lens unit 12B, at least one second lens unit 13B, and at least one mark element 14B, wherein said at least one first lens unit 12B and said at least second lens unit 13B are sequentially stacked in said lens tube 11B, and said lens tube 11B fixes said first lens unit 12B and said second lens unit 13B. What is unlike the above preferred example is said mark element 14B of said lens 10B, said mark element 14B is provided in the lens tube 11B, in order that said mark element 14B is used to determine the position and shape of an imaging surface 101 of said lens 10B.

Said mark element 14B includes a mark body 141B and is further provided with at least one cut edge 142B, wherein said cut edge 142B is formed in said mark body 141B. Said mark body 141B of said mark element 14B is integrally molded on the lens tube 11B. In this preferred example of the present invention, said mark body 141B of said mark element 14B is integrally molded on the lens tube 11B. said mark body 141B of said mark element 14B is integrally molded on the lens tube 11B, wherein said cut edge 142B is visually identifiable so that according to the location of said cut edge 142B, the location and shape of an imaging surface 101 of said camera lens 10B are determined. Preferably, said cutting edge 142B has a depth of between 0.1 and 0.3 mm.

Figure 7C:
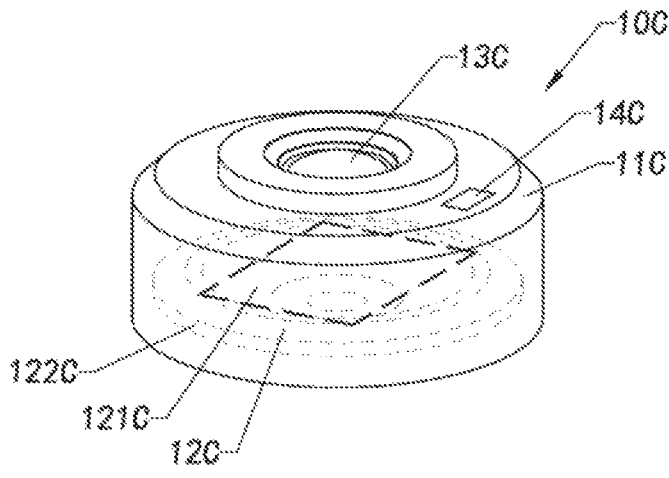
FIG. 7C is a schematic diagram of another alternative example of a camera lens of the camera module according to the above-described preferred example of the present invention.

As shown in FIG. 7C, a camera lens 10C of said camera module according to the above-described preferred example of the present invention is set forth in the description that follows. Said camera lens 10C includes a lens tube 11C, at least one first lens unit 12C, at least one second lens unit 13C, and at least one mark element 14C, wherein said at least one first lens unit 12C and said at least second lens unit 13C are sequentially stacked in said lens tube 11C, and said lens tube 11C fixes said first lens unit 12C and said second lens unit 13C. What is unlike the above preferred example is said mark element 14C of said lens 10C, said mark element 14C is provided in the lens tube 11C, in order that said mark element 14C is used to determine the position and shape of an imaging surface 101 of said lens 10C.

In this preferred example of the present invention, said mark element 14C is implemented as a mark element affixed to the lens tube 11C. Preferably, said mark element 14C may be, but is not limited to, a coating wherein said mark element may be recognized by a vision system to determine the location and shape of an imaging surface 101 of said camera lens 10C according to the location of said mark element 14C.

Figure 7D:
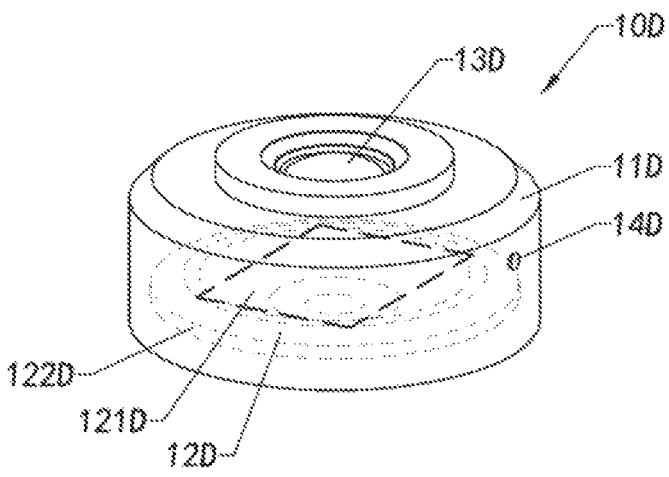
FIG. 7D is a schematic diagram of another alternative example of a camera lens of the camera module according to the above-described preferred example of the present invention.

As shown in FIG. 7D, another alternative example of said camera module in accordance with the above-described preferred example of the present invention of a camera lens 10D is set forth in the description that follows. Said camera lens 10D includes a lens tube 11D, at least one first lens unit 12D, at least one second lens unit 13D and at least one mark element 14D, wherein said at least one first lens unit 12D and said at least second lens unit 13D are sequentially stacked in said lens tube 11D, and said lens tube 11D fixes said first lens unit 12D and said second lens unit 13D. What is unlike the above preferred example is said mark element 14D of said camera lens 10D, said mark element 14D is provided on the side of the lens tube 11D.

Specifically, the lens tube body 111D of the lens tube 11D further has a lens tube outer sidewall 1115D, wherein the mark element 14D is provided on the lens tube outer sidewall 1115D, and the mark element 14D is visually identifiable, so that said mark element 14D determines the position and shape of an imaging surface 101 of said camera lens 10D. Notably, in this preferred example of the present invention, said mark element 14D may be, but is not limited to, a raised structure integrally molded on the lens tube 11D, a mark element integrally molded on the lens tube body 111D and having a slot, or said mark element 14D is implemented as a coating that is affixed to the lens tube body 111D and is visually identifiable.

Figure 7E:
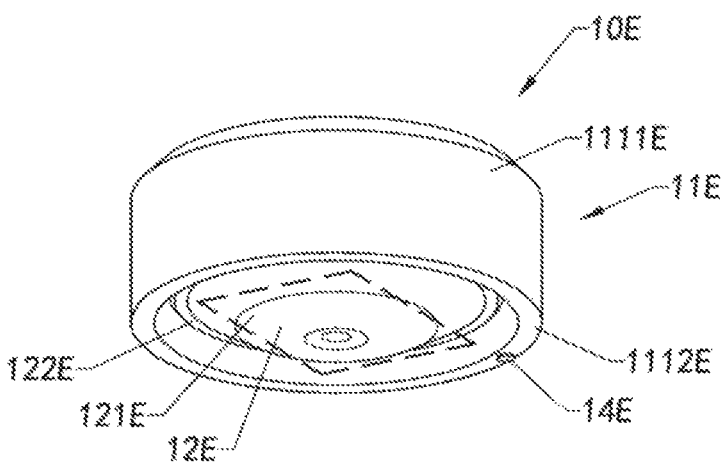
FIG. 7E is a schematic diagram of another alternative example of a camera lens of the camera module according to the above-described preferred example of the present invention.

As shown in FIG. 7E, a camera lens 10E of another alternative example of said camera module according to the above preferred example of the present invention is set forth in the description that follows. Said camera lens 10E includes a lens tube 11E, at least one first lens unit 12E, at least one second lens unit 13E and at least one mark element 14E, wherein said at least one first lens unit 12E and said at least second lens unit 13E are stacked sequentially in said lens tube 11E, and said lens tube 11E fixes said first lens unit 12E and said second lens unit 13E. What is unlike the above preferred example is said mark element 14E of said camera lens 10E, said mark element 14E is provided at the bottom of the lens tube 11E.

Specifically, said lens tube 11E includes a lens tube body 111E, wherein the lens tube body 111E includes a lens tube upper end portion 1111E and a lens tube lower end portion 1112E extending integrally downward from the lens tube upper end portion 1111E. Said mark element 14E is provided at the lens tube lower end portion 1112E. In this preferred example of the present invention, said mark element 14E may be, but is not limited to, a raised structure integrally molded on the lens tube 11E, a mark element integrally molded on the lens tube body 111E and having a slot, or said mark element 14E is implemented as a coating that is attached to the lens tube body 111E and is visually identifiable.

According to another aspect of the present invention, the present invention further provides a manufacturing method of a camera lens 10, wherein said manufacturing method includes the follow steps:

(a) providing at least one mark element 14 in a lens tube 11.

(b) assembling at least one first lens unit 12 and at least one second lens unit 13 in the lens tube 11, wherein said first lens unit 12 includes an effective diameter portion 121 and a structural portion 122; and (c) adjusting the position of said at least one first lens unit 12 to a particular location of said mark element 14 according to the location of said mark element 14, in order that said mark element 14 marks said effective diameter portion 121 of said first lens unit 12.

In said step (a) of said method of manufacturing the camera lens of the present invention, said mark element 14 is formed in a lens tube body 111 of the lens tube 11, and said mark element 14 is a projection integrally molded on the lens tube body 111.

In said step (a) of the above method of manufacturing a camera lens of the present invention, said mark element 14 is formed in the lens tube body 111 of the lens tube 11, and said mark element 14 includes a mark body 141 and a mark slot 142 formed in said mark body 141.

In said step (a) of the above-described method of manufacturing a camera lens of the present invention, said mark element 14 is provided at an upper end portion 1111 of said lens tube body 111, and by the means of visual identification of said mark element 14, the position and shape of said imaging surface 101 of said camera lens 10 are identified.

In said step (a) of the above-described method of manufacturing a camera lens of the present invention, said mark element 14 is provided at a lower end portion 1112 of said lens tube body 111, and by the means of visual identification of said mark element 14, the position and shape of said imaging surface 101 of said lens 10 are identified.

According to another aspect of the present invention, the present invention further provides a manufacturing method of a camera lens 10, wherein said manufacturing method includes the follow steps:

(I) assembling at least one first lens unit 12 and at least one second lens unit 13 in a lens tube 11, wherein said first lens unit 12 includes an effective diameter portion 121 and a structural portion 122, and said structural portion 122 extends outwardly from said effective diameter portion 121; and (II) identifying an imaging surface 101 formed by said camera lens 10, and providing at least one mark element 14 according to said imaging surface 101 at a location of the lens tube 11 at a specific location from said effective diameter portion 121, so that the location and shape of said imaging surface 101 are determined by visual identification of said mark element 14.

It is worth mentioning that in this preferred manufacturing method of the present invention, the manner for providing said mark element 14 and the structure of the mark element 14 are the same as that in the above-described preferred example.

Figure 8:
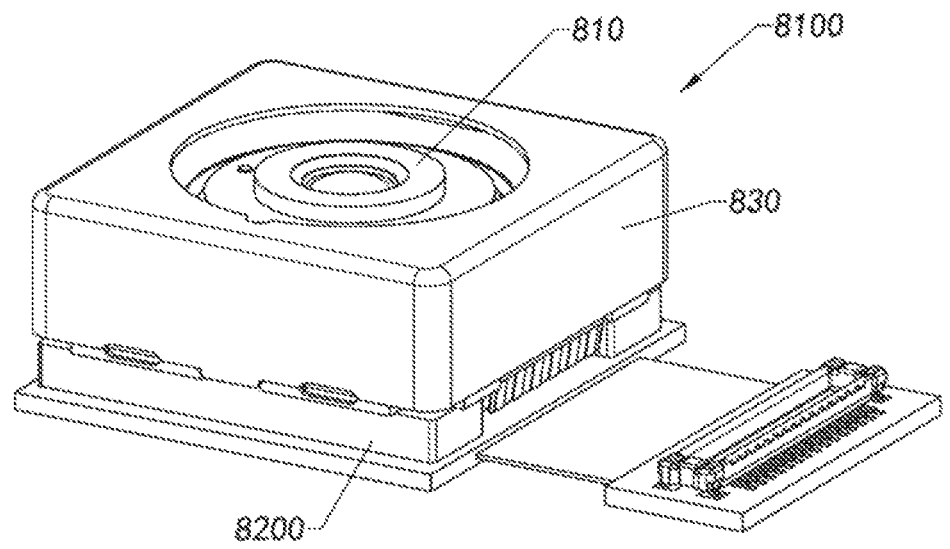
FIG. 8 is an overall schematic view of an extra-wide-angle camera module according to a first preferred example of the present invention.
Figure 9A:
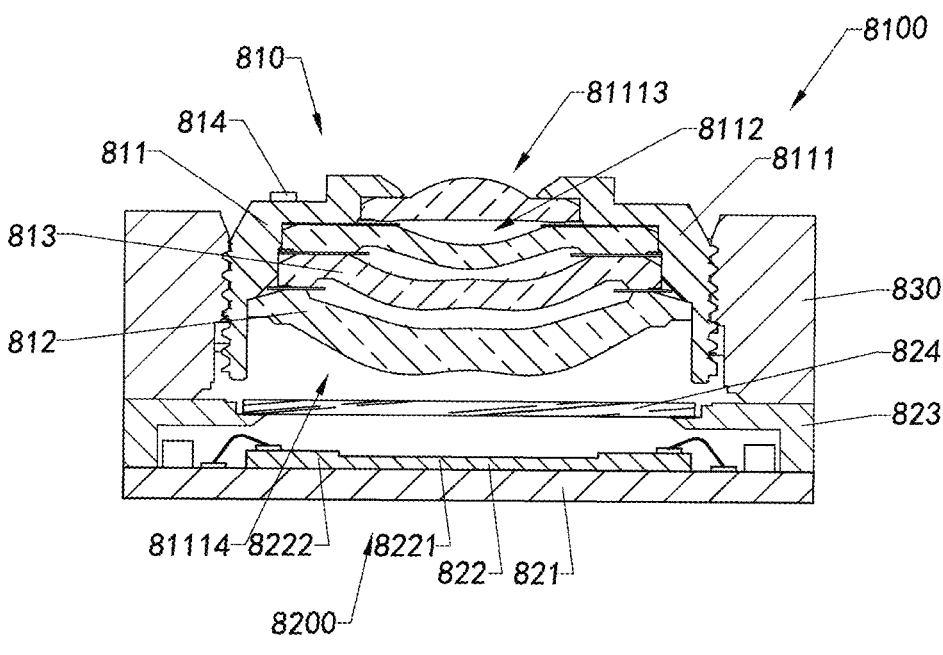
FIG. 9A is a cross-sectional view of the extra-wide-angle camera module according to the above-described preferred example of the present invention.

Referring to FIGS. 8 and 9A of the drawings of the specification of the present invention, the assembly method of an extra-wide-angle camera module according to another preferred example of the present invention is set forth in the following description. In this preferred example of the present invention, said lens assembly 8100 is provided with marks, and the marks provided on said lens assembly 8100 can be identified by the visual identification system of the assembly device during the assembly process. In this preferred example of the present invention, said lens assembly 8100 is provided with marks, and during assembly, the marks provided on said lens assembly 8100 can be identified by the visual identification system of the assembly device, and the relative positions of said lens assembly 8100 to said photosensitive assembly 8200 are adjusted according to the visually identified positions of said marks so that said lens assembly 8100 matches said photosensitive assembly 8200 and said photosensitive assembly 8200 can image properly.

An alternative example of said lens assembly 8100 of said extra-wide-angle camera module of the present invention is illustrated in FIG. 9A, wherein said lens assembly 8100 includes a camera lens 810 and a lens fixing component 830, wherein said camera lens 810 is fixedly provided in said lens fixing component 830, and in case that said photosensitive assembly 8200 is energized, said lens fixing component 830 fixes said camera lens 810 on said photosensitive assembly 8200 based on the optical imaging performance of said photosensitive assembly 8200. Said camera lens 810 has a marking function, wherein said camera lens 810 is oriented to said lens fixing component 830 based on the marking position of said camera lens 810, and said camera lens 810 is adjusted by adjusting the position of said lens fixing component 830 in relation to said photosensitive assembly 8200.

In this preferred example of the present invention, said assembly device of said extra-wide-angle camera module identifies said lens assembly 8100, and clamps and fixes visually identified lens assembly 8100, and said assembly device adapts the mounting position of said lens assembly 8100 to said photosensitive assembly 8200 by adjusting the relative position of said lens assembly 8100 relative to said photosensitive assembly 8200, i.e., said photosensitive assembly 8200 obtains clear and reliable imaging. It readily occurs to those skilled in the art that after said assembly device of said extra-wide-angle camera module clamping said lens assembly 8100, by adjusting the position of said lens assembly 200 relative to said lens assembly 8100, said photosensitive assembly 8200 is adapted to said lens assembly 8100.

Said camera lens 810 corrects distortions corresponding to imaging light projected into the field range of said extra-wide-angle camera module of said photosensitive assembly 8200, said camera lens 810 forms a target surface 8101 at a position corresponding to said photosensitive assembly 8200, in order that by the means of correction through said lens 810, the field curvature and distortion of said extra-wide-angle camera module is corrected. In other words, when said camera lens 810 is provided, said camera lens 810 is fixed to said photosensitive assembly 8200 by said lens fixing component 830 in such a way that the shape of its target surface 8101 is adapted to the shape of the imaging area of said photosensitive assembly 8200.

As shown in FIG. 9A, said camera lens 810 includes a lens tube 811, at least one free-form optical lens 812, at least one lens unit 813, and at least one mark element 814, wherein said at least one free-form optical lens 812 and said at least one lens unit 813 are sequentially stacked in said lens tube 811, with the lens tube 811 fixing said free-form optical lens 812 and said lens unit 813, said mark element 814 is provided in said lens tube 811, and said mark element 814 marks the position of said target surface 8101 of said camera lens 810. By visual identification of the location of said mark element 814, said camera lens 810 is directionally fixed to said lens fixing component 830, i.e. the lens tube 811 of said camera lens 810 is fixed to said lens fixing component 830, that is, according to the location of said mark element 814, said camera lens 810 is fixed to said lens fixing component 830. After said camera lens 810 being fixed to said lens fixing component 830, said mark element 814 is located at a specific position of said lens fixing component 830 in order to adjust the position of said lens fixing component 830 relatives to said photosensitive assembly 8200 by visual identification of said mark element 814.

A visual identification system of said assembly device identifies said mark element 814 of said camera lens 810, wherein after said visual identification system identifies the mark element 814, said camera lens 810 is clamped by a clamp fixing component of said assembly device and the position of said lens 810 is adjusted according to the position of the mark element 814. The position where said lens 810 is fixed to lens fixing component 830 is adjusted according to the position of the mark element 814 so that said assembly device clamps said lens fixing component 830 and fixes said lens assembly 8100 to said photosensitive assembly 8200 in a manner adapted to said photosensitive assembly 8200 by manipulating the position and angle of said lens fixing component 830.

Said photosensitive assembly 8200 includes a circuit board 821, a photosensitive element 822, a lens holder 823, and at least one filter 824, wherein said photosensitive element 822 is provided conductively on said circuit board 821, and said lens holder 823 is provided on said circuit board 821, and said filter 824 is affixed to said lens holder 823. Said lens fixing component 830 is fixedly provided to said lens holder 823 of said photosensitive assembly 8200 according to the location of said mark element 814. Said photosensitive element 822 of said photosensitive assembly 8200 has a photosensitive imaging area 8221 and a non-photosensitive imaging area 8222 surrounding said photosensitive imaging area 8221, by adjusting the relative position of said lens fixing component 830 to said photosensitive assembly 8200, the shape of said target surface 8101 formed by said lens 810 is adapted to the shape of said photosensitive imaging area 8221.

It is worth mentioning that said camera lens 810 forms said target surface 8101 on an upper surface of said photosensitive element 822, wherein the dimension of said target surface 8101 are slightly larger than the dimension of said photosensitive imaging area 8221 of said photosensitive element 822 in order to make full use of said photosensitive element 822 as well as to reserve a certain fitting allowance.

It will be understood by those skilled in the art that at least one surface of said free-form optical lens 812 of said camera lens 810 is free-form, i.e., said free-form optical lens 812 is a non-rotationally symmetrical lens. Thus, said target surface 8101 formed by said free-form optical lens 812 is a non-circular area, i.e., said camera lens 810 corrects the field curvature and distortion of said extra-wide-angle camera module, and the area incident on the upper surface of said photosensitive element 822 is of a non-rotationally symmetrical shape. Since said lens tube 811 of said camera lens 810 is rotationally symmetric, when said camera lens 810 is rotated, said target surface 8101 formed on said photosensitive element 822 by said camera lens 810 rotates with the rotation of said camera lens 810.

Preferably, in this preferred example of the present invention, said target surface 8101 formed by said camera lens 810 is a rectangular surface adapted to the shape of said photosensitive element 822, it can be understood by those skilled in the art that the shape of said target surface 8101 of said camera lens 810 is related to the optical characteristics of said free-form optical lens 812 of said camera lens 810 , i.e., said target surface 8101 formed by said camera lens 810 is used herein only as exemplary but not a limitation. Thus, in other examples of the present invention, said target surface 8101 formed by said camera lens 810 may also be implemented in other shapes.

When said lens fixing component 830 and said photosensitive assembly 8200 are adjusted and fixed, the position of said target surface 8101 relative to said photosensitive imaging area 8221 of said photosensitive element 822 is identified by the visually identified position of said mark element 814, which in turn adjusts said lens fixing component 830 or adjusts said photosensitive assembly 8200 so that said target surface 8101 is adapted to said photosensitive imaging area 8221 of said photosensitive element 822.

Specifically, during assembly of the extra-wide-angle camera module, said photosensitive assembly 8200 is illuminated, wherein said photosensitive assembly 8200 is fixed, the relative position of said lens fixing component 830 to said photosensitive assembly 8200 is adjusted and fixed; or said lens fixing component 830 is fixed, the relative position of said photosensitive assembly 8200 to said lens fixing component 830 is adjusted and fixed. The assembly device visually identifies said mark element 814 and determines the position and shape of said target surface 8101 formed by said camera lens 810 according to the location of said mark element 814. In a state where said photosensitive assembly 8200 is illuminated, the relative positions of said photosensitive assembly 8200 and said lens fixing component 830 are adjusted according to the location of said mark element 814 such that said target surface 8101 formed by said camera lens 810 covers said photosensitive imaging area 8221 of said photosensitive element 822.

It is worth mentioning that since said free-form optical lens 812 of said camera lens 810 of said extra-wide-angle camera module is non-rotationally symmetrical body, during the adjusting process, it is necessary to shift and tilt said lens fixing component 830 or said photosensitive assembly 8200, i.e. to translate in the x- and y-axis directions and tilt in the z-axis direction, in order that the optical axis of said camera lens 810 is perpendicular to said photosensitive element 822 and the optical center of said camera lens 810 is at the center of said photosensitive imaging area 8221. In addition, it is necessary to consider rotation during active focusing, i.e. by adjusting said lens assembly 8100 or said photosensitive assembly 8200 by rotation in order that said target surface 8101 formed by said camera lens 810 is adapted to the shape of said photosensitive imaging area 8221 of said photosensitive element 822, and the assembly device adjusts said photosensitive assembly 8200 or said lens fixing component 830 to ensure that said target surface 8101 formed by said camera lens 810 covers said photosensitive imaging area 8221 of said photosensitive element 822.

When said target surface 8101 formed by said camera lens 810 is rectangular, it is adjusted in order that the long side of said target surface 8101 corresponds to the long side of said photosensitive imaging area 8221 and the short side of said target surface 8101 corresponds to the short side of said photosensitive imaging area 8221. Preferably, said camera lens 810 is directionally fixed to said lens fixing component 830 based on visually identifiable mark element 814, and when said lens fixing component 830 and said photosensitive assembly 8200 are adjusted and mounted, said target surface 8101 formed by said camera lens 810 can cover said photosensitive imaging area 8221 of said photosensitive element 822.

Figure 9B:
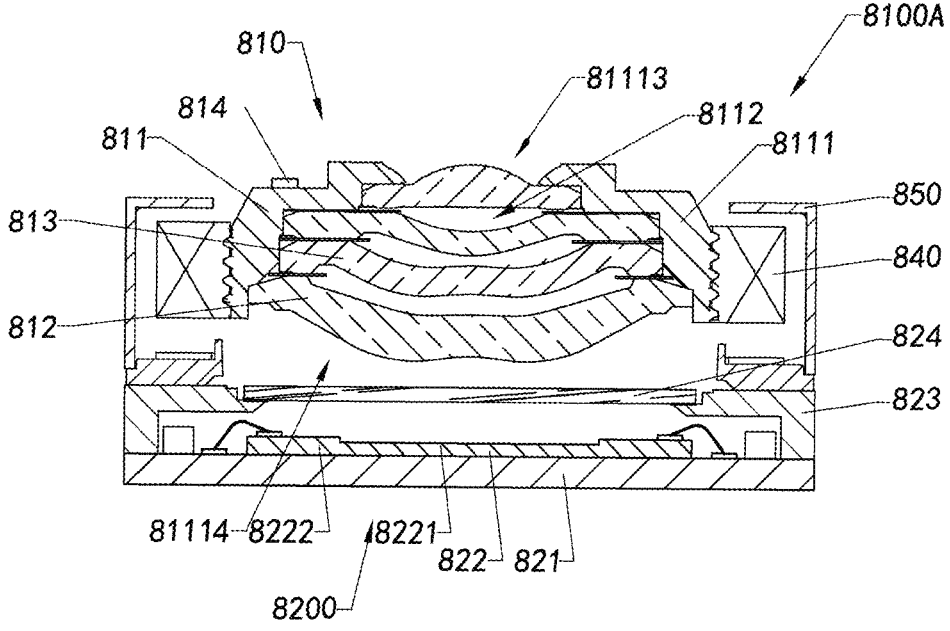
FIG. 9B is a cross-sectional view of another alternative example of the extra-wide-angle camera module according to the above-described preferred example of the present invention.

As shown in FIG. 9B, according to another aspect of the present invention, said extra-wide-angle camera module of the present invention may also be implemented as a camera module capable of autofocusing, i.e., a camera module with a motor. Accordingly, said extra-wide-angle camera module includes a lens assembly 8100A and a photosensitive assembly 8200. What is unlike the above preferred example is said lens assembly 8100A, wherein said lens assembly 8100A includes a camera lens 810, at least one motor 840, and at least one motor housing 850, said camera lens 810 is drivably connected to said motor 840, and said motor 840 drives the movement of said camera lens 810 based on said motor housing 850, in order to adjust the focus position of said camera lens 810.

In this preferred example of the present invention, said camera lens 810 is fixed in height to said motor housing 850 by said motor 840, with said motor housing 850 fixing said camera lens 810 to said photosensitive assembly 8200. When said camera lens 810 is fixed to said motor housing 850, said camera lens 810 is directionally provided in said motor housing 850 according to the location of said mark element 814, in order that the direction of said target surface 8101 formed by said camera lens 810 is adapted to the direction of said motor housing 850. After said camera lens 810 is fixed in height to said motor housing 850, and said motor housing 850 is adjusted and fixed at said photosensitive assembly 8200 according to the location of said mark element 814, said target surface 8101 formed by said camera lens 810 covers said photosensitive imaging area 8221 of said photosensitive element 822, and said motor housing 850 is adapted to said photosensitive assembly 8200. In other words, when said target surface 8101 covers said photosensitive imaging area 8221 and said motor housing 850 is fixed to said photosensitive assembly 8200, wherein said motor housing 850 is fixed in a position adapted to said photosensitive assembly 8200 to avoid misalignment of said motor housing 850 with said circuit board 821 of said photosensitive assembly 8200, which would cause a poor appearance of said large wide-angle camera module.

The position of said target surface 8101 is determined according to the position of the visually identified mark element 814, and said camera lens 810 is fixed to said motor 840 in a manner that said target surface 8101 is formed in an orientation compatible with said motor housing 850. Exemplarily, the orientation and position of said target surface 8101 is determined according to the position of the mark element 814, and the long side of said target surface 8101 is adjusted to be oriented parallel to one side of said motor housing 850, to make the orientation of the attachment of the photosensitive element 822 to be adapted to the rectangular orientation of said circuit board 821, in order that after undergoing active focusing adjustment, when said target surface 8101 is adapted to said photosensitive imaging area 8221 of said photosensitive element 822, the orientations of said motor housing 850 and said circuit board 821 also satisfy the corresponding process.

Specifically, when said camera lens 810 is fixed to said motor housing 850, said motor housing 850 is fixed to a fixed height fixture, wherein said visual identification system of said assembly device identifies said mark element 814 of said camera lens 810 and the outer contour of said motor housing 850. The rotation adjustment angle required for said lens tube 811 of said camera lens 810 to be fixed to said motor housing 850 is determined according to the mark element 814 and the outer contour of said motor housing 850 as identified. Said assembly device clamps said lens tube 811 of said camera lens 810, and the mounting position of said lens tube 811 is adjusted according to the position of said mark element 814 such that one side (e.g., the long side) of said target surface 8101 formed by said camera lens 810 is parallel to one side of the outer contour of said motor housing 850 to ensure parallel assembly of said lens 810 to said motor 840.

As shown in FIG. 9A or FIG. 9B, the lens tube 811 includes a lens tube body 8111 and a lens mounting cavity 8112 formed in the lens tube body 8111, wherein said lens unit 813 and said free-form optical lens 812 are fixed in said lens mounting cavity 8112 by the lens tube body 8111. Said mark element 814 is provided in the lens tube 811 of the lens tube body 8111 to determine the approximate location and shape of said target surface 8101 formed by said camera lens 810 by visual identification of the location of said mark element 814.

It could be understood that said mark element 814 is integrally molded on the lens tube body 8111, wherein said free-form optical lens 812 and said lens unit 813 are fixedly mounted in said lens mounting cavity 8112 according to the location of said mark element 814, in order that the location of said mark element 814 determines the approximate position and shape of said target surface 8101 formed by said camera lens 810. It readily occurs to those skilled in the art that after said free-form optical lens 812 and said lens unit 813 are mounted in said lens mounting cavity 8112 of the lens tube 811, said mark element 814 is set in said lens tube body 8111 according to said target surface 8101 formed by said camera lens 810, so as to determine the approximate position and shape of said target surface 8101 formed by said camera lens 810 according to visually identified mark element 814.

Said lens tube body 8111 of said lens tube 811 further includes a lens tube upper end 81111 and a lens tube lower end 81112 extending integrally downward from said lens tube upper end 81111, wherein the lens tube upper end 81111 defines an upper opening 81113 of the lens tube 811 and the lens tube lower end 81112 defines a lower opening 81114 of the lens tube 811, and said lens mounting cavity 8112 connects said upper opening 81113 and said lower opening 81114.

Figure 10A:
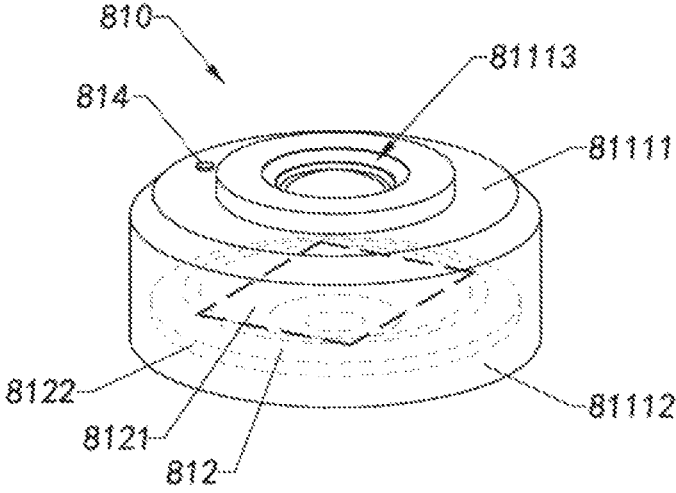
FIG. 10A is an overall schematic view of a camera lens of the extra-wide-angle camera module according to the above-described preferred example of the present invention.

As shown in FIG. 10A, in this preferred example of the present invention, said mark element 814 is provided at said lens tube upper end portion 81111 body 8111 in order that the assembly device visually identifies the location of said mark element 814 at the upper end of the lens tube 811 to identify the location and shape of said target surface 8101 formed by said camera lens 810. Preferably, in this preferred example of the present invention, the mark element 814 is implemented as a projection, wherein the mark element 814 is integrally molded in said upper end of the lens tube body 8111.

It readily occurs to those skilled in the art that said mark element 814 may also be provided at other locations of the lens tube body 8111, such as said lower end portion 81112 of the lens tube 811 or the outer side wall of the lens tube 811. That is, the location where the mark element 814 is provided is used herein only as exemplary and not as a limitation. The visual identification system of the assembly device can identify said mark element 814 according to different positions of said mark element 814 in order to calculate the position of said target surface 8101.

Said free-form optical lens 812 includes an effective diameter portion 8121 and a structured light portion 8122, wherein said effective diameter portion 8121 is located on an inner side of said structured light portion 8122, and outside light reaches said target surface 8101 via said effective diameter portion 8121 and outside light reaches the outer side of said target surface 8101 via said structured light portion 8122. In short, said effective diameter portion 8121 of said free-form optical lens 812 corresponds to the position of the area of said target surface 8101 formed by said camera lens 810. Said mark element 814 is used to mark the position and shape of said effective diameter portion 8121 of said free-form optical lens 812. Exemplarily, in this preferred example of the present invention, said effective diameter portion 8121 of said free-form optical lens 812 is projected in a rectangular shape along the optical axis direction.

In this preferred example of the present invention, the mark element 814 is provided at a specific location from said effective diameter portion 8121, such as a location where the mark element 814 corresponds to a center plane of a long side of said effective diameter portion 8121. Using visually identified mark element 814, the assembly device calculates the orientation of said effective diameter portion 8121 of said free-form optical lens 812 in order that said assembly device adjusts the relative position of said lens assembly 8100 to said photosensitive assembly 8200 according to the orientation of said effective diameter portion 8121. Alternatively, the assembly device obtains the orientation of said effective diameter portion 8121 of said free-form optical lens 812 according to the identified mark element 814, and adjusts the orientation of said effective diameter portion 8121 to be adapted to the orientation of said motor housing 850. During the process of active focusing of said lens assembly 8100A, said assembly device clamps said motor housing 850, and when the effective diameter portion of said free-form optical lens 812 is adapted to said photosensitive imaging area 8221 of said sensing element 822, the orientation of said motor housing 850 and the orientation of said circuit board 821 are also adapted to each other.

Preferably, said mark element 814 is provided at said lens tube upper end portion 81111, wherein at least one of said mark elements 814 corresponds to an intersection of a mid-axis surface of said long or short side of said effective diameter portion 8121 of said free-form optical lens 812 with the lens tube 811. It readily occurs to those skilled in the art that the location and number of said mark elements 814 are provided herein only as exemplary, and not as a limitation. That is, based on the visually identification of the location of said mark element 814 relative to the lens tube body 8111, the vision system determines said effective diameter portion 8121 of said free-form optical lens 812, and thus determining the position and shape of said target surface 8101. It readily occurs to those skilled in the art that said effective diameter portion 8121 of said free-form optical lens 812 can be determined by the positions of two or more of said mark elements 814 arranged at the lens tube body 8111, and thus the position and shape of said target surface 8101 can be determined.

Said mark elements 814 project from said lens tube upper end portion 81111 of the lens tube body 8111, wherein the height of said mark elements 814 is between 0.1 and 0.3 mm.

Figure 10B:
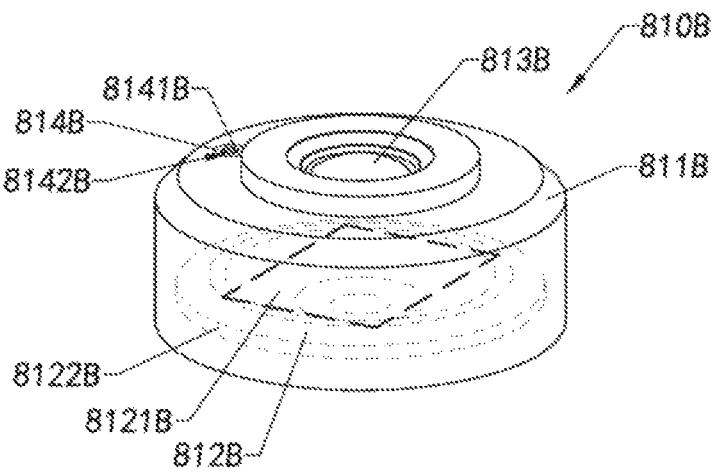
FIG. 10B is a schematic view of another alternative example of the camera lens of the extra-wide-angle camera module according to the above-described preferred example of the present invention.

As shown in FIG. 10B, according to another aspect of the present invention, another alternative example of said camera lens 810B of the present invention is set forth in the description that follows. Said camera lens 810B includes a lens tube 811B, at least one free-form optical lens 812B, at least one lens unit 813B and at least one mark element 814B, wherein said at least one free-form optical lens 812B and said at least one lens unit 813B are sequentially stacked in said lens tube 811B, and said lens tube 811B fixes said free-form optical lens 812B and said lens unit 813B. What is unlike the above preferred example is said mark element 814B of said camera lens 810B, said mark element 814B is provided in the lens tube 811B, in order that said mark element 814B is used to determine the position and shape of a target surface 8101 of said camera lens 810B.

Said mark element 814B includes a mark body 8141B and is further provided with at least one mark slot 8142B, wherein said mark slot 8142B is formed in said mark body 8141B. Said mark body 8141B of said mark element 814B is integrally molded on the lens tube 811B. In this preferred example of the present invention, said mark body 8141B of said mark element 814B is integrally molded on the lens tube 811B, wherein said mark slot 8142B is visually identifiable, in order that the location and shape of a target surface 8101 of said camera lens 810B is determined according to the location of said mark slot 8142B. Preferably, said mark slot 8142B has a depth of between 0.1 and 0.3 mm.

Figure 10C:
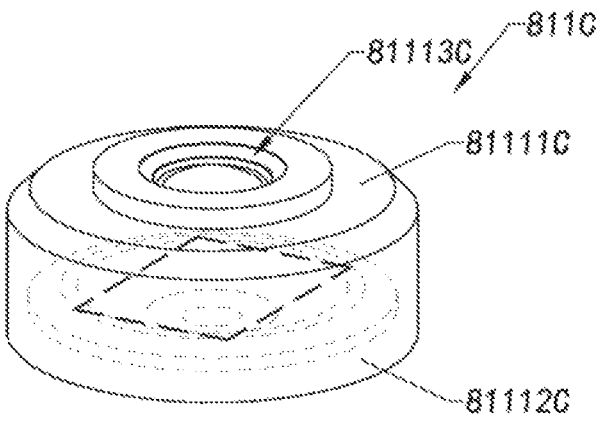
FIG. 10C is a schematic diagram of another alternative example of the camera lens of the extra-wide-angle camera module according to the above-described preferred example of the present invention.

As shown in FIG. 10C, according to another aspect of the present invention, another alternative example of said camera lens 810C of the present invention is set forth in the description that follows. Said camera lens 810C includes a lens tube 811C, at least one free-form optical lens 812C, at least one lens unit 813C, and at least one mark element 814C, wherein said at least one free-form optical lens 812C and said at least one lens unit 813C are sequentially stacked in said lens tube 811C, and said lens tube 811C fixes said free-form optical lens and said lens unit 813C. What is unlike the above preferred example is said mark element 814C of said camera lens 810C. In the preferred example of the present invention, said mark element 814C of said camera lens 810C is a black coating provided on said structured light portion 8122C of said free-form optical lens 12C, wherein said mark element 814C is visually identifiable in order to identify said effective diameter portion 8121C of said free-form optical lens 812C according to the shape of said mark element 814C. In other words, said mark element 814C is provided outside said effective diameter 8121C of said free-form optical lens 812C, wherein said mark element 814C marks said effective diameter 8121C of said free-form optical lens 812C, and based on the visually identifiable position and shape of said mark element 814C, the position and shape of said target surface 8101C formed by said lens 810C.

Preferably, in this preferred example of the present invention, the mark element 814C is provided at said free-form optical lens 812C, wherein the mark element 814C obscures said structured light portion 8122C. Optionally, the mark element 814C may also be provided at said lens unit 813C, wherein the mark element 814C is affixed to said lens unit 813C at a position corresponding to said structured light portion 8122C. Optionally, said mark element 814C is provided in said lens tube 811C of said camera lens 810C, wherein said mark element 814C is used to mark the position of said effective diameter portion 8121C of said free-form optical lens 812C. It could be understood that said mark element 814C may be implemented as a shading element which blocks light entering to said structured light portion 8122C and allows light entering to said effective diameter portion 8121C to pass.

Figure 10D:
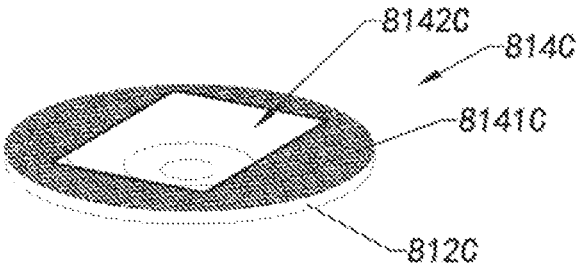
FIG. 10D is a schematic diagram of another alternative example of the camera lens of the extra-wide-angle camera module according to the above-described preferred example of the present invention.

As shown in FIG. 10D, according to another aspect of the present invention, another alternative example of said camera lens 810D of the present invention is set forth in the description that follows. Said camera lens 810D includes a lens tube 811D, at least one free-form optical lens 812D, at least one lens unit 813D and at least one mark element 814D, wherein said at least one free-form optical lens 812D and said at least one lens unit 813D are sequentially stacked in said lens tube 811D, and said lens tube 811D fixes said free-form optical lens 812D and said lens unit 813D. What is unlike the above preferred example is said mark element 814D of said camera lens 810D. In a preferred example of the present invitation, said mark element 814D of said camera lens 810D is integrally molded in said lens tube 811D of said camera lens 810D, wherein said mark element 814D forms a mark slot at said lens tube 811D by means of a cut edge. Wherein said mark slot corresponds to said effective diameter 121D of said free-form optical lens 812D, i.e., the position of said effective diameter 121D of said free-form optical lens 812D can be obtained by visual identification of said mark slot, and thus the position and shape of said target surface 8101 can be determined.

Figure 10E:
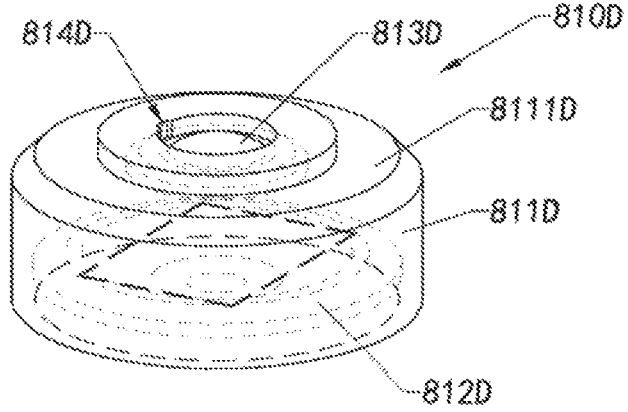
FIG. 10E is a schematic diagram of another alternative example of the camera lens of the extra-wide-angle camera module according to the above-described preferred example of the present invention.
Figure 10F:
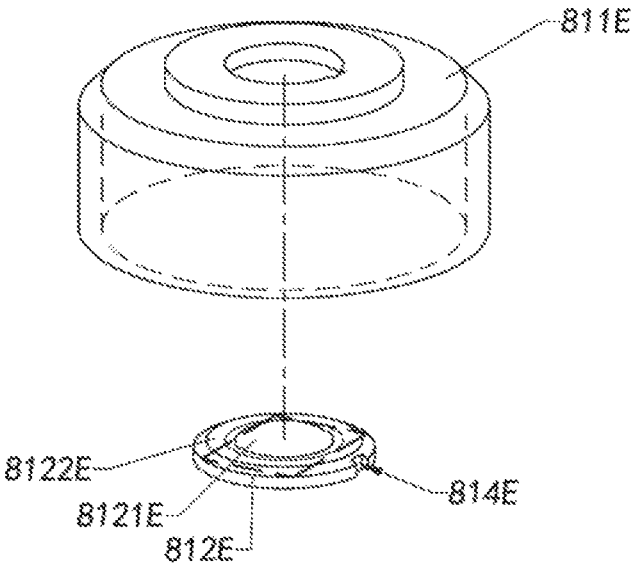
FIG. 10F is a schematic diagram of another alternative example of the camera lens of the extra-wide-angle camera module according to the above-described preferred example of the present invention.
Figure 11:
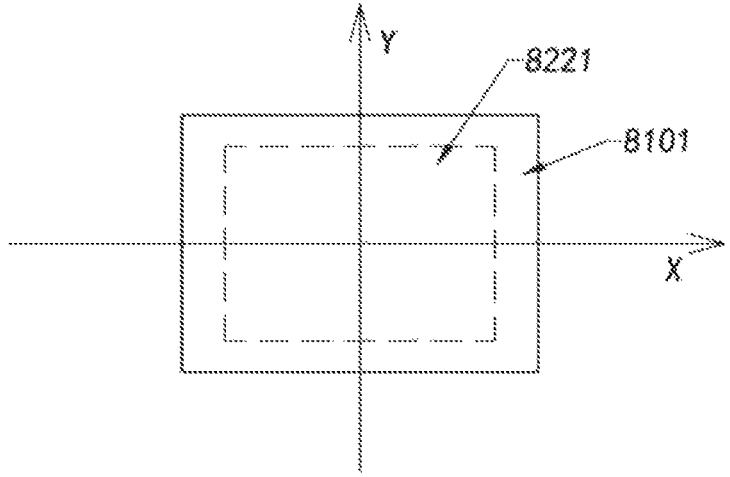
FIG. 11 is a schematic diagram of a target surface formed by the camera lens of the extra-wide-angle camera module according to the above-described preferred example of the present invention.
Figure 12:
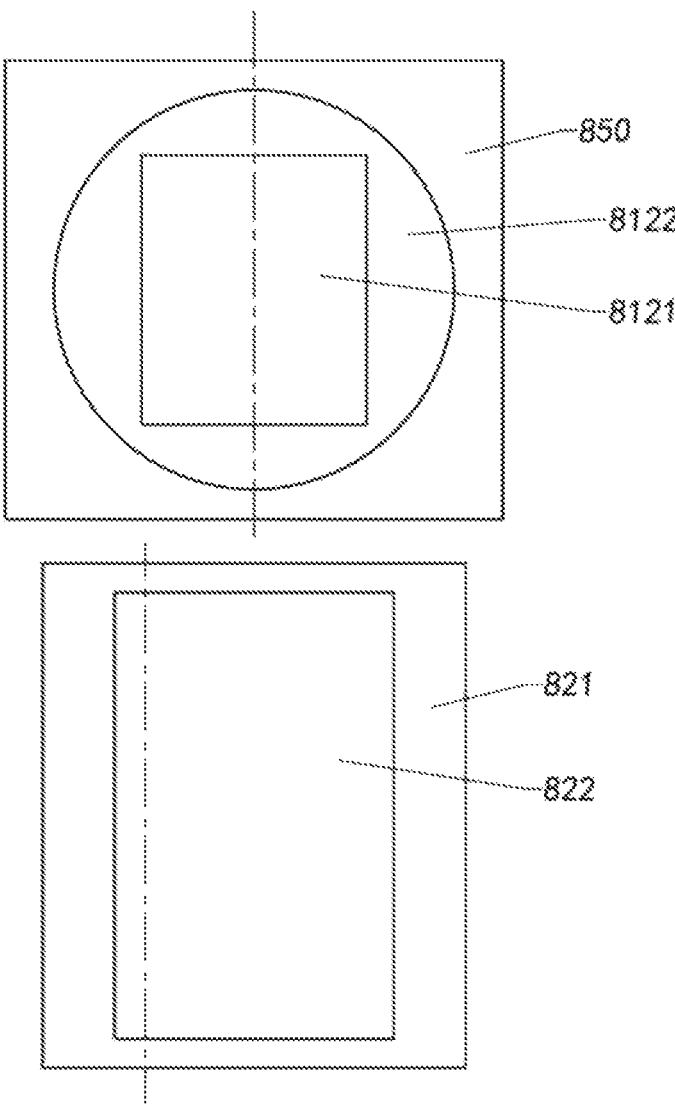
FIG. 12 is a schematic diagram of a mounting method of the camera lens and a motor of the extra-wide-angle camera module according to the above-described preferred example of the present invention.
Figure 13:
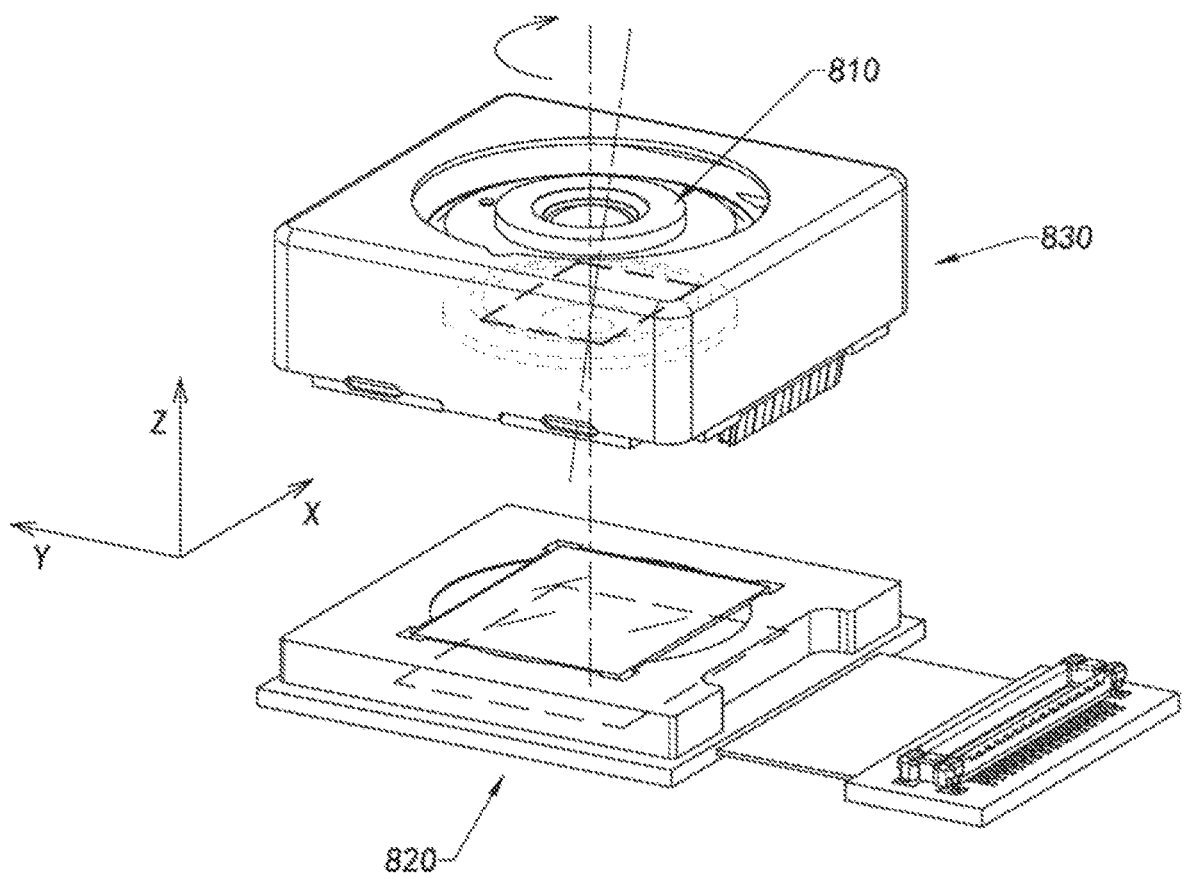
FIG. 13 is a schematic diagram of an adjustment action of the extra-wide-angle camera module according to the above-described preferred example of the present invention.
Figure 14A:
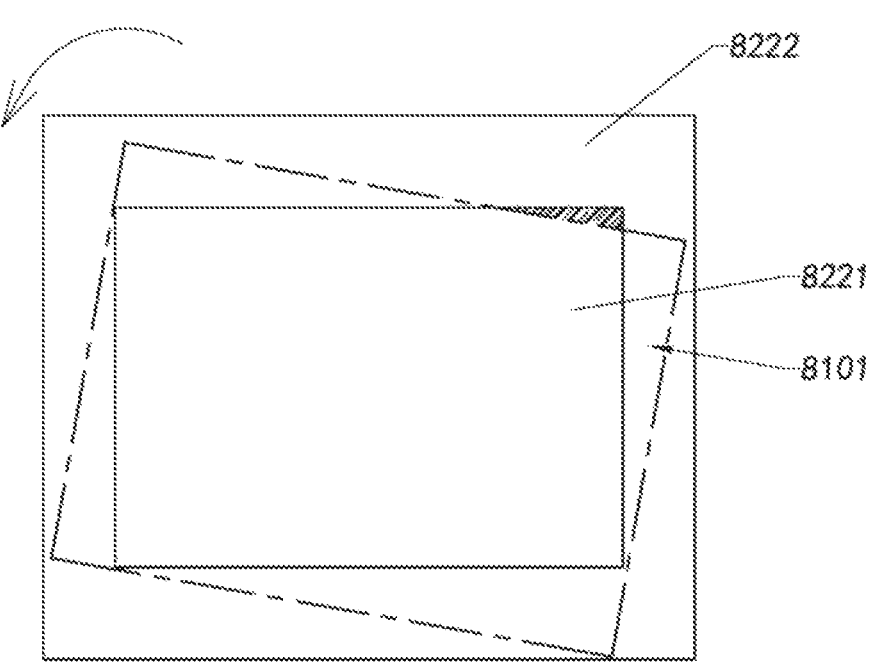
FIGS. 14A to 14D are schematic diagrams of a correction of a mounting process of the extra-wide-angle camera module according to the above-described preferred example of the present invention.
Figure 14B:
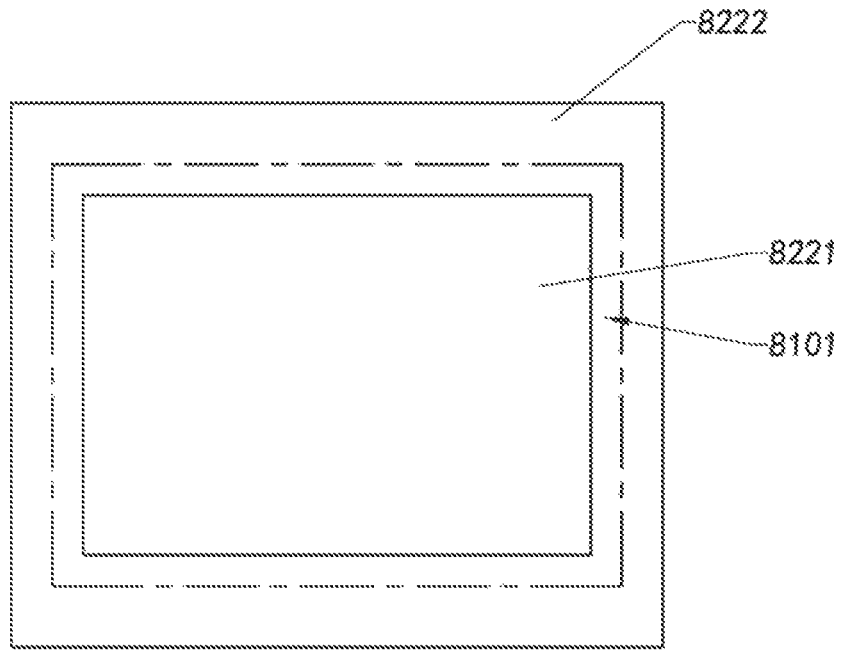
Figure 14C:
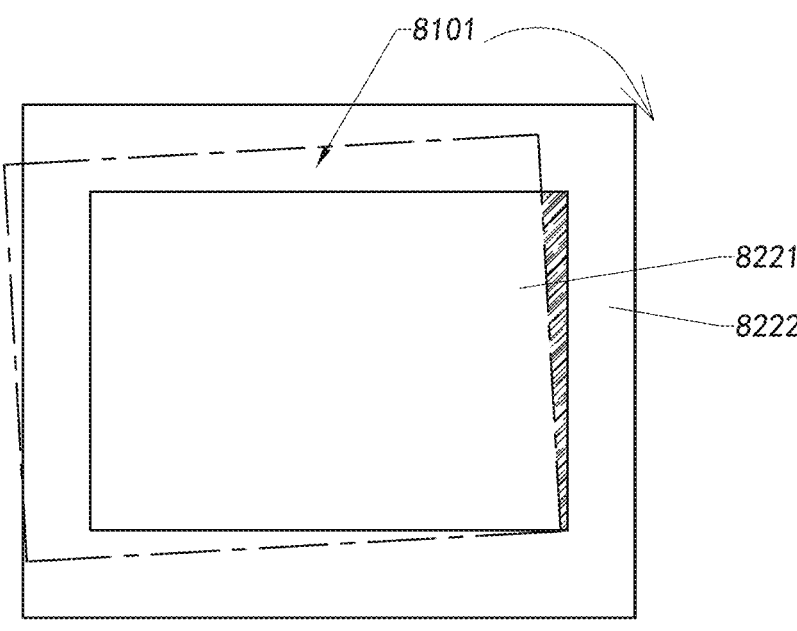
Figure 14D:
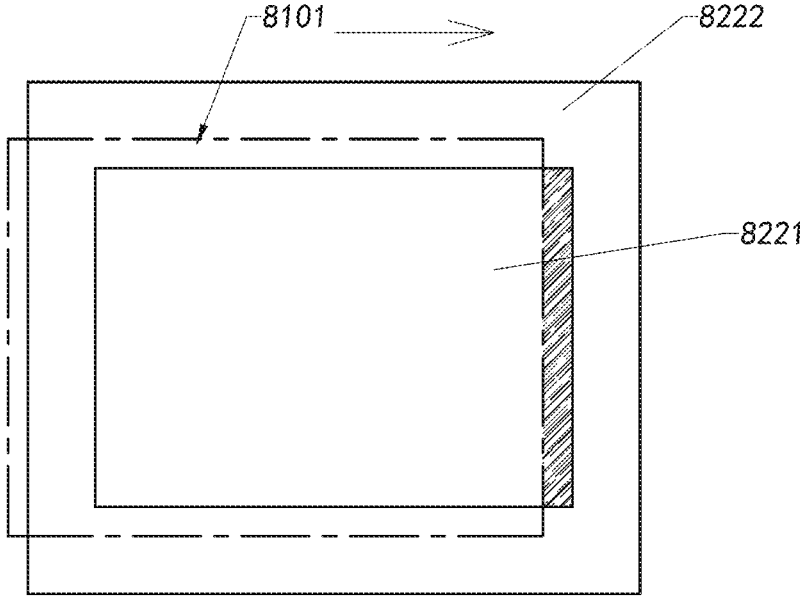

As shown in FIG. 10E, according to another aspect of the present invention, another alternative example of said camera lens 810E of the present invention is set forth in the description that follows. Said camera lens 810E includes a lens tube 811E, at least one free-form optical lens 812E, at least one lens unit 813E, and at least one mark element 814E, wherein said at least one free-form optical lens 812E and said at least one lens unit 813E are sequentially stacked in said lens tube 811E, with said lens tube 811E fixing said free-form optical lens 812E and said lens unit 813E. What is unlike the above preferred example is said mark element 814E of said camera lens 810E. In this preferred example of the present invention, said mark element 814E of said camera lens 810E is integrally molded in said free-form optical lens 812E (or said lens unit 813E) of said camera lens 810E, wherein said mark element 814E forms a mark slot at the edge of said structured light portion 8122E of said free-form optical lens 812E in a cut edge manner, wherein said mark slot corresponds to said effective diameter portion 8121E of said free-form optical lens 812E, i.e. the visual identification of said mark slot allows to obtain the position of said effective diameter portion 8121E of said free-form optical lens 812E, and thereby determining the position and shape of said target surface 8101.

According to another aspect of the present invention, said assembly method of an extra-wide-angle camera module of the present invention includes the following steps:

(a) photographing a lens assembly 8100 being clamped, identifying at least one mark element 814 of a camera lens 810 of said lens assembly 8100 based on a visual identification system, and determining an orientation of an effective diameter portion 8121 of a free-form optical lens 812 of said camera lens 810 according to said identified mark element 814.

(b) energizing a photosensitive assembly 8200, and acquiring an image information captured by said photosensitive assembly 8200.

(c) adjusting the position of said lens assembly 8100 relative to said photosensitive assembly 8200 based on said captured image information, so that a target surface 8101 formed by said camera lens 810 covers a photosensitive imaging area 8221 of said photosensitive assembly 8200, and said photosensitive assembly 8200 images clearly; and (d) fixing said lens assembly 8100 and said photosensitive assembly 8200.

in said step (a) of said assembly method of the present invention, said lens assembly 8100 is clamped by the assembly device, said visual identification system of said assembly device photographs said camera lens 810 to identify said mark element 814, wherein said mark element for marking said effective diameter portion 8121 of said free-form optical lens 812 is provided at said lens tube 811 of said camera lens 810, said free-form optical lens 812 or said lens unit 813. Accordingly, in this preferred example of the present invention, said mark element 814 may be implemented as a projection, a slot or a coating, etc. Exemplarily, said mark element 814 is a projection integrally molded on the lens tube 811, wherein said projection is recognizable by said visual identification system; or the mark element is formed on the lens tube 811 by means of drilling hole.

Said assembly device visually identifies said mark element 814 and uses said mark element 814 as an object of visual identification, said assembly device calculates position and shape of said effective diameter portion 8121 of said free-form optical lens 812 according to the position of the object of visual identification.

The present invention further includes following steps before the step (a) of the assembly method:

(a0.1) identifying the mark element 814 of said camera lens 810 and the outer contour of a motor housing 850; and (a0.2) fixing said camera lens 810 to said motor housing 850 in such a manner that said effective diameter portion 8121 of said free-form optical lens 812 is oriented to fit the outer contour of said motor housing 850.

Said step (a0.2) in said assembly method of the present invention further includes the following steps:

according to the location of said mark element 814, calculating the rotation angle difference between the orientation of said effective diameter portion 8121 of said camera lens 810 and the outer contour of said motor housing 850.

rotating said lens tube 811 of said camera lens 810 so that one side of said effective diameter portion 8121 is parallel to one side of said motor housing 850; and dispensing and curing said camera lens 810 and a motor 840 to make said camera lens 810 to be parallel to said motor housing 850.

In said step (a) of said assembly method of the present invention, further including the following steps:

(a.1) photographing said photosensitive assembly 8200, and identifying the position of a photosensitive element 822 of said photosensitive assembly 8200; and (a.2) initially adjusting said lens assembly 8100 according to the position and orientation of said effective diameter portion 8121 of said camera lens 810 and the position of said photosensitive element 822 in order that the edge of said effective diameter portion 8121 is substantially parallel to the contour of said photosensitive element 822.

Said step (b) of the assembly method of the present invention further includes the following steps:

controlling the device for clamping said lens assembly 8100 to rotate a certain angle; and recording the image taken by said photosensitive assembly 8200 during the rotation of said lens assembly 8100.

Said step (b) of said assembly method of the present invention further includes the following steps:

controlling the device for clamping said lens assembly 8100 to translate in the x/y direction; and recording the image taken by said photosensitive assembly 8200 during the translation of said lens assembly 8100.

Said step (c) of said assembly method of the present invention further includes the following steps:

(c.1) processing the acquired image, and capturing an imaging boundary of said photosensitive element 822; and (c.2) determining a correction direction of said lens assembly 8100 with the imaging boundary of said photosensitive element 822 based on the change in a dark corner area of the image boundary, and calculating a correction angle of said lens assembly 8100.

Said step (c) of said assembly method of the present invention further includes the following steps:

(c.3) driving said lens assembly 8100 to rotate directionally according to the obtained correction angle such that the edge of said effective diameter portion 8121 is parallel and corresponding to the vertical direction to an edge of said photosensitive element 822; and (c.4) translating and tilting said lens assembly 8100 based on the information of the captured image such that an area of a target surface 8101 formed by said camera lens 810 of said lens assembly 8100 covers a photosensitive imaging area 8221 of said photosensitive element 822 and said photosensitive assembly 8200 acquires a clear image.

It should be understood by those skilled in the art that the examples of the present invention described above and shown in the drawings are intended only as examples and do not limit the present invention. The purpose of the present invention has been completely and effectively achieved. The functions and structural principles of the present invention have been shown and illustrated in the examples, and the examples of the present invention may be subject to any variation or modification without departing from the principles described.

The invention claimed is:

1. A camera lens, comprising:
a lens tube;
at least one first lens unit and at least one second lens unit, wherein the first lens unit and the second lens unit are provided in the lens tube, and the first lens unit is a non-rotational symmetrical member; and
at least one mark element, wherein the mark element is provided in the lens tube in a non-rotational symmetrical manner, the mark element positions the first lens unit, the mark element is integrally provided on the lens tube, and the mark element is a raised structure.

2. The camera lens according to claim 1, wherein the mark element has a fixed predetermined angle to a non-circular imaging surface of the first lens unit so as to determine the position and angle of the first lens unit according to the mark element.

3. The camera lens according to claim 2, wherein the first lens unit includes an effective diameter portion and a structural portion, and the structural portion extends outwardly from the effective diameter portion, and the mark element is provided on the lens tube corresponding to a specific position from the effective diameter portion based on the effective diameter portion of the first lens unit, such that the mark element marks the position and orientation of the effective diameter portion.

4. The camera lens according to claim 2, wherein the first lens unit includes an effective diameter portion and a structural portion, and the structural portion extends outwardly from the effective diameter portion, and the first lens unit is adjusted according to the position of the mark element in order that the effective diameter portion of the first lens unit is located at a specific position from the mark element, such that the mark element marks the effective diameter portion.

5. The camera lens according to claim 3, wherein the mark element further includes a mark body and is further provided with at least one mark slot, and the mark body is integrally molded on the lens tube, and the mark slot is formed on the mark body, in order to identify the mark element by means of visual identification of the mark slot.

6. The camera lens according to claim 4, wherein the mark element further includes a mark body and is further provided with at least one mark slot, and the mark body is integrally molded on the lens tube, and the mark slot is formed on the mark body in order to identify the mark element by visual identification of the mark slot.

7. The camera lens according to claim 3, wherein the mark element further includes a mark body and is further provided with at least one cut edge, and the mark body is integrally molded on the lens tube, and the cut edge is formed on the mark body in order to identify the mark element by means of visual identification of the cut edge.

8. The camera lens according to claim 4, wherein the mark element further includes a mark body and is further provided with at least one cut edge, and the mark body is integrally molded on the lens tube, and the cut edge is formed on the mark body in order to identify the mark element by means of visual identification of the cut edge.

9. The camera lens according to claim 3, wherein the mark element is a coating, and the mark element is affixed to the lens tube.

10. The camera lens according to claim 2, wherein the lens tube further includes a lens tube body and a lens mounting cavity, and the first lens unit and the second lens unit are fixed to the lens mounting cavity by the lens tube body, and the lens tube body further includes a lens tube upper end portion and a lens tube lower end portion, and the mark element is provided at the lens tube upper end portion or the lens tube lower end portion of the lens tube body.

11. The camera lens according to claim 2, wherein the lens tube body of the lens tube has a lens tube outer sidewall, and the mark element is provided on the lens tube outer sidewall of the lens tube body.

12. A camera module, comprising:
a photosensitive assembly; and
a camera lens, wherein the camera lens is provided in the photosensitive assembly, and the camera lens further includes:
a lens tube;
at least one first lens unit and at least one second lens unit, wherein the first lens unit and the second lens unit are provided in the lens tube, and the first lens unit is a non-rotational symmetrical member; and
at least one mark element, wherein the mark element is provided in the lens tube in a non-rotational symmetrical manner, and the mark element is used to position the first lens unit, the mark element is integrally provided on the lens tube, and the mark element is a raised structure.

13. The camera module according to claim 12, wherein the photosensitive assembly includes a circuit board, a photosensitive element, and the photosensitive element is provided conductively on the circuit board, and the camera lens is provided in the light-sensing path of the photosensitive element.

14. The camera module according to claim 13, wherein the first lens unit and the second lens unit form an imaging surface on an upper surface of the photosensitive element, and mounting positions of the camera lens and the photosensitive assembly are adjusted according to the position and angle of the imaging surface.

15. The camera module according to claim 14, further including a lens fixing component, wherein the lens tube of the lens is orientedly fixed to the lens fixing component according to the location of the mark element, and the corresponding position of the imaging surface to the photosensitive imaging area of the photosensitive element is identified by the visually identified location of the mark element, and the lens fixing component is thereby adjusted so that the imaging surface is adapted to the photosensitive imaging area of the photosensitive element.

16. The camera module according to claim 12, further including a motor and a motor housing, wherein the orientation of the mark element of the lens tube and the orientation of the motor housing have a fixed pre-determined angle.

17. The camera module according to claim 12, wherein the first lens unit includes an effective diameter portion and a structural portion, and the structural portion extends outwardly from the effective diameter portion, and the mark element is provided on the lens tube corresponding to a specific position from the effective diameter portion based on the effective diameter portion of the first lens unit, such that the mark element marks the effective diameter portion.

18. The camera module according to claim 12, wherein the first lens unit includes an effective diameter portion and a structural portion, and the structural portion extends outwardly from the effective diameter portion, and the first lens unit is adjusted according to the position of the mark element such that the effective diameter portion of the first lens unit is located at a specific position from the mark element, such that the mark element marks the effective diameter portion.

\* \* \* \* \*